United States Patent [19]

Nishizawa et al.

[11] Patent Number: 5,566,632
[45] Date of Patent: Oct. 22, 1996

[54] CONTROL METHOD FOR AUTOMATIC SEWING MACHINE AND APPARATUS THEREOF

[75] Inventors: Yoshifumi Nishizawa; Tomonori Abe; Iwao Yamane; Satoru Yamada, all of Nagoya, Japan

[73] Assignee: Mitsubishi Denki Kabushiki Kaisha, Tokyo, Japan

[21] Appl. No.: 43,819

[22] Filed: Apr. 7, 1993

[30] Foreign Application Priority Data

Apr. 7, 1992 [JP] Japan ..................... 4-085579

[51] Int. Cl.⁶ .................................. D05B 21/00
[52] U.S. Cl. ................ 112/470.03; 112/470.06; 112/475.05
[58] Field of Search .............. 112/121.12, 121.11, 112/262.3, 266.1, 103, 262.1, 470.02, 470.03, 470.04, 470.06, 470.07, 475.03, 475.04, 475.05; 318/696, 811

[56] References Cited

U.S. PATENT DOCUMENTS

| | | | |
|---|---|---|---|
| 4,365,565 | 12/1982 | Kawai et al. | 112/121.12 X |
| 4,391,211 | 7/1983 | Yamamoto et al. | 112/121.12 |
| 4,459,926 | 7/1984 | Ohnina | 112/121.12 |
| 4,691,649 | 9/1987 | Takano et al. | 112/457 X |
| 4,956,595 | 9/1990 | Hirofumi et al. | 318/696 |
| 4,982,675 | 1/1991 | Taguchi et al. | 112/470.07 |
| 5,150,030 | 9/1992 | Ito et al. | 318/811 |

FOREIGN PATENT DOCUMENTS

| | | |
|---|---|---|
| 2660532 | 1/1977 | Germany . |
| 3213277 | 11/1982 | Germany . |
| 3518473 | 11/1986 | Germany . |
| 118238 | of 0000 | Japan . |
| 60-29515 | 7/1985 | Japan . |
| 62-159694 | 7/1987 | Japan . |

*Primary Examiner*—Peter Nerbun
*Attorney, Agent, or Firm*—Sughrue, Mion, Zinn, Macpeak & Seas; Richard C. Turner; Laura C. Brutman

[57] ABSTRACT

A sewing machine arrangement comprises a sewing machine, a motor for driving a spindle, and a motor for operating a two-axis drive mechanism. When the two-axis drive mechanism is driven at a maximum speed, processing is executed in which a speed (t) slower than the maximum speed is inserted by a program. Further, drive current flowing through the motor for driving the two-axis drive mechanism is set. A phase exciting method of a stepping motor is switched.

19 Claims, 35 Drawing Sheets

FIG.4(A) VCO OUTPUT
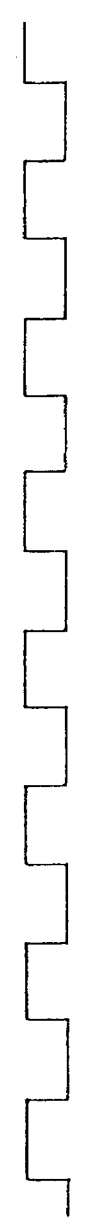
FIG.4(B) TIMER TWO DIVIDING
FIG.4(C) INTERRUPT TIMING
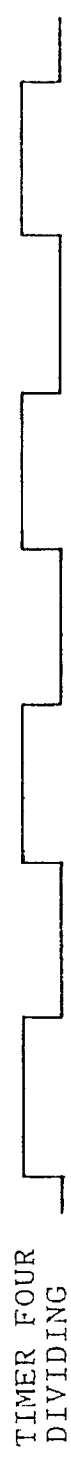
FIG.4(D) TIMER FOUR DIVIDING
FIG.4(E) INTERRUPT TIMING

n: STITCH NUMBER

1: FIRST STITCH

L: LAST STITCH $K_{1\sim 5}$: CONSTANT

FIG. 7(A)

| FIRST STITCH | SECOND STITCH | OTHER | BEFORE ONE STITCH OF LAST STITCH | LAST STITCH |
|---|---|---|---|---|
| $K_1$ | $K_2$ | $K_5$ | $K_4$ | $K_3$ |

FIG. 7(B)

| $X_1$ | $X_2$ | $X_3$ | $X_4$ | $X_5$ | | |
|---|---|---|---|---|---|---|
| $K_a$ | $K_b$ | $K_c$ | $K_d$ | $K_e$ | | |

FIG. 7(C)

| $Y_1$ | $Y_2$ | $Y_3$ | $Y_4$ | $Y_5$ | |
|---|---|---|---|---|---|
| $k_a$ | $k_b$ | $k_c$ | $k_d$ | $k_e$ | |

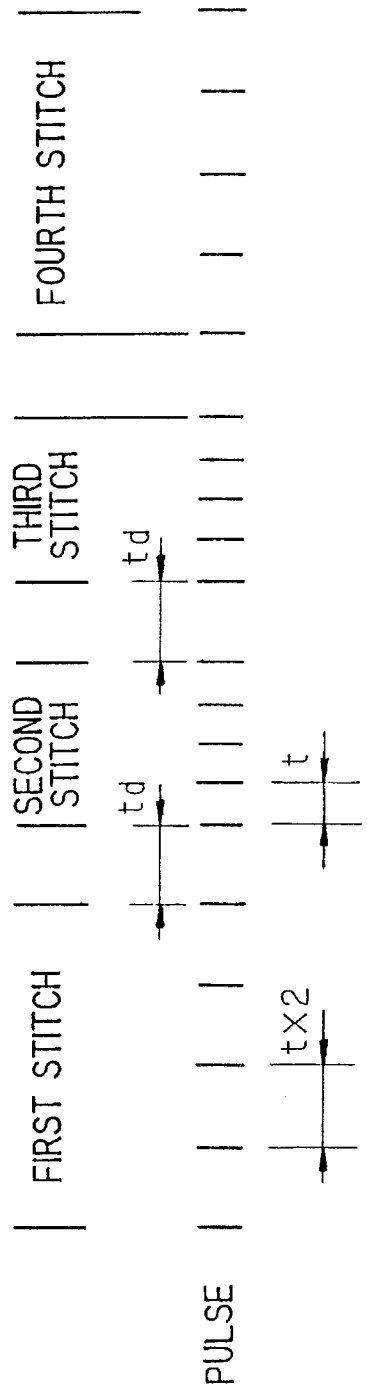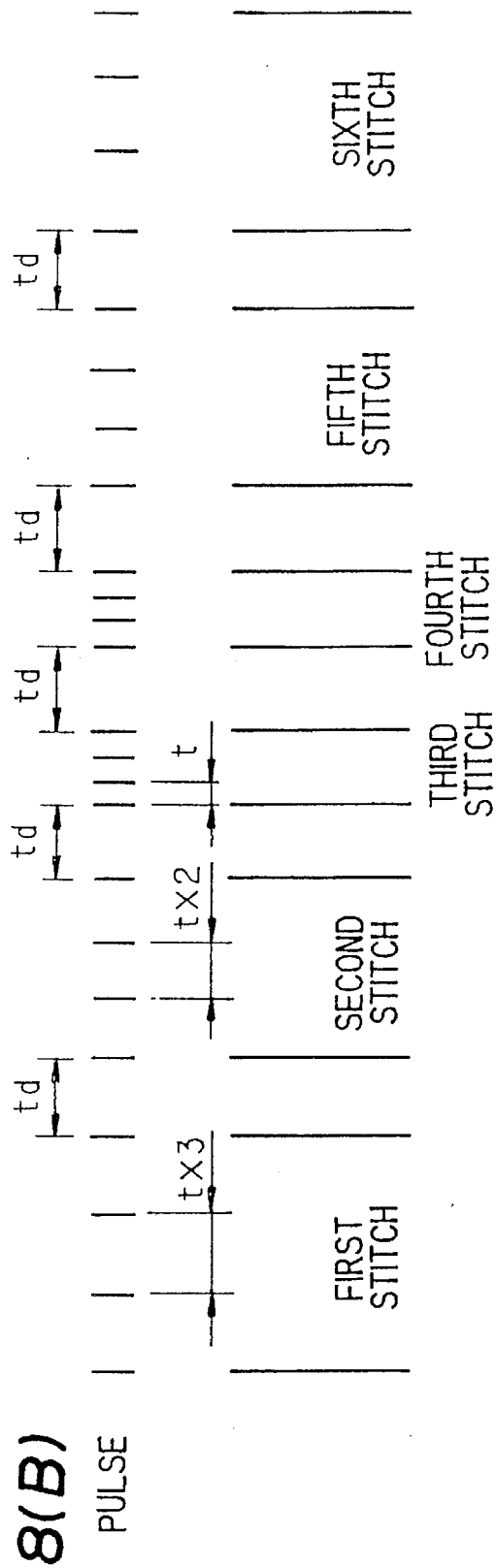

FIG. 10

| $x_1$ | $x_2$ | $x_3$ | $x_4$ | $x_5$ |
|---|---|---|---|---|
| $L_a$ | $L_b$ | $L_c$ | $L_d$ | $L_e$ |

| $y_1$ | $y_2$ | $y_3$ | $y_4$ | $y_5$ |
|---|---|---|---|---|
| $l_a$ | $l_b$ | $l_c$ | $l_d$ | $l_e$ |

FIG. 14 (A)

| $x_1$ | $x_2$ | $x_3$ | $x_4$ | $x_5$ | $x_6$ | $x_7$ | $x_8$ | $x_9$ |
|---|---|---|---|---|---|---|---|---|
| 1 | 0 | 1 | 0 | 1 | 0 | 1 | 0 | 1 |

| $X_1$ | $X_2$ | $X_3$ | $X_4$ | $X_5$ | $X_6$ | $X_7$ | $X_8$ | $X_9$ |
|---|---|---|---|---|---|---|---|---|
| 1 | 1 | 1 | 1 | 1 | 1 | 1 | 1 | 1 |

FIG. 14 (B)

| $y_1$ | $y_2$ | $y_3$ | $y_4$ | $y_5$ | $y_6$ | $y_7$ | $y_8$ |
|---|---|---|---|---|---|---|---|
| 1 | 0 | 1 | 0 | 1 | 0 | 1 | 0 |

| $Y_1$ | $Y_2$ | $Y_3$ | $Y_4$ | $Y_5$ | $Y_6$ | $Y_7$ | $Y_8$ |
|---|---|---|---|---|---|---|---|
| 1 | 1 | 1 | 1 | 1 | 1 | 1 | 1 |

FIG. 15
X=20  
Y=15  

FIG. 21(A)

| $x_1$ | $x_2$ | $x_3$ | $x_4$ | $x_5$ |
|---|---|---|---|---|
| A$_H$ | 8$_H$ | 35$_H$ | 8$_H$ | A$_H$ |

| X$_1$ | X$_2$ | X$_3$ | X$_4$ | X$_5$ |
|---|---|---|---|---|
| tX4 | tX3 | tX2 | tX3 | tX4 |

FIG. 21(B)

| $x_1$ | $x_2$ | $x_3$ | $x_4$ | $x_5$ | $x_6$ |
|---|---|---|---|---|---|
| A$_H$ | 8$_H$ | 14$_H$ | 1$_H$ | 14$_H$ | 1$_H$ |

| X$_1$ | X$_2$ | X$_3$ | X$_4$ | X$_5$ | X$_6$ |
|---|---|---|---|---|---|
| tX4 | tX3 | tX2 | tX4 | tX2 | tX4 |

FIG. 21(C)

| $x_1$ | $x_2$ | $x_3$ | $x_4$ | $x_5$ | $x_6$ |
|---|---|---|---|---|---|
| A$_H$ | 8$_H$ | 14$_H$ | 1$_H$ | 14$_H$ | 1$_H$ |

| X$_1$ | X$_2$ | X$_3$ | X$_4$ | X$_5$ | X$_6$ |
|---|---|---|---|---|---|
| tX4X2 | tX3X2 | tX2X2 | tX4X2 | tX2X2 | tX4X2 |

| STAGE | SIGNAL | | | | |
|---|---|---|---|---|---|
| | 1 | 2 | 3 | 4 | 5 |
| XAP | 1 | 1 | 1 | 1 | 0 |
| XAN | 0 | 0 | 0 | 0 | 0 |
| XASEN1 | 0 | 0 | 1 | 0 | 0 |
| XASEN2 | 0 | 0 | 0 | 1 | 0 |
| XBP | 0 | 1 | 1 | 1 | 1 |
| XBN | 0 | 0 | 0 | 0 | 0 |
| XBSEN1 | 0 | 0 | 1 | 0 | 0 |
| XBSEN2 | 0 | 1 | 0 | 0 | 0 |

⟶ CW
⟵ CCW

90°=1.8° ; 2 PHASE EXCITATION
45°=0.9° ; 1-2 PHASE EXCITATION
22.5°=0.45° ; HALF STEP DRIVE

SPECIAL CODE
2 BITE DATA

| SPECIAL CODE | NUMBER OF MOVEMENTS | | | | | |
|---|---|---|---|---|---|---|
| 1  0 | 0 | 0 | 1 | 0 | 1 | 0 |

$X_1$ $X_2$ $X_3$ $X_4$ $X_5$ $X_6$ $X_7$ $X_8$ $X_9$ $X_{10}$

0AH  08H  14H  8IH  14H  1H  14H  -----

SPECIAL CODE

FIG.30(A)
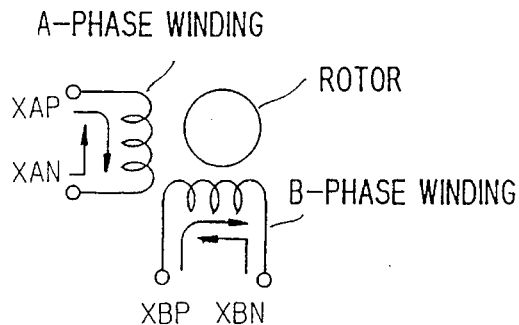
A-PHASE WINDING
ROTOR
B-PHASE WINDING
FIG.30(B)
2 PHASE EXCITATION
| STEP | 1 | 2 | 3 | 4 |
|------|---|---|---|---|
| XAP  | 1 | 0 | 0 | 0 |
| XAN  | 0 | 0 | 1 | 0 |
| XBP  | 0 | 1 | 0 | 0 |
| XBN  | 0 | 0 | 0 | 1 |
→ CW
← CCW
FIG.30(C)
1-2 PHASE EXCITATION
| STEP | 1 | 2 | 3 | 4 | 5 | 6 | 7 | 8 |
|------|---|---|---|---|---|---|---|---|
| XAP  | 1 | 1 | 0 | 0 | 0 | 0 | 0 | 1 |
| XAN  | 0 | 0 | 0 | 1 | 1 | 1 | 0 | 0 |
| XBP  | 0 | 1 | 1 | 1 | 0 | 0 | 0 | 0 |
| XBN  | 0 | 0 | 0 | 0 | 0 | 1 | 1 | 1 |
← CCW
→ CW
FIG.30(D)
DIRECTION OF TORQUE AND EXCITATION
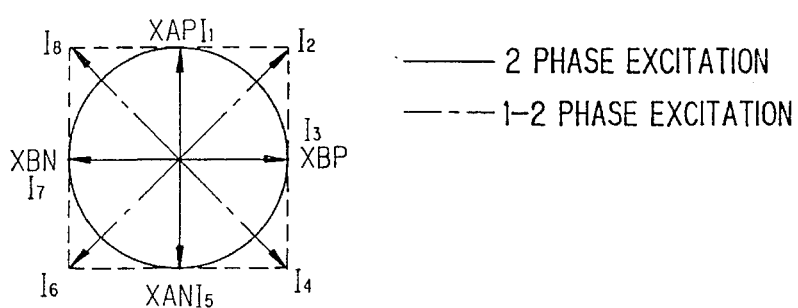
—— 2 PHASE EXCITATION
---- 1-2 PHASE EXCITATION

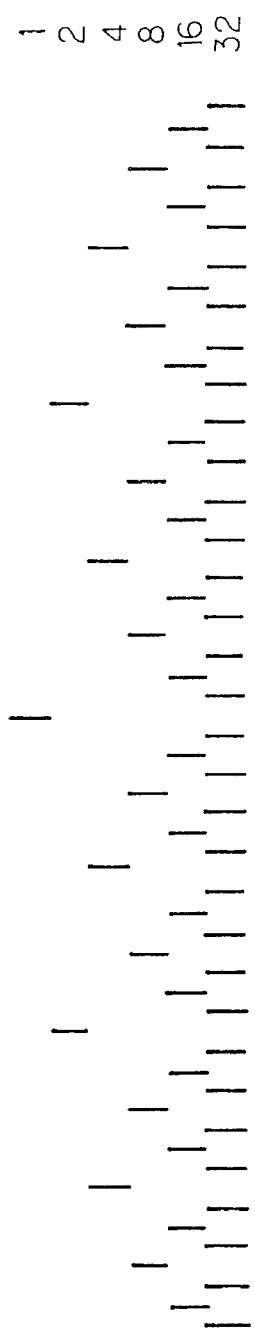
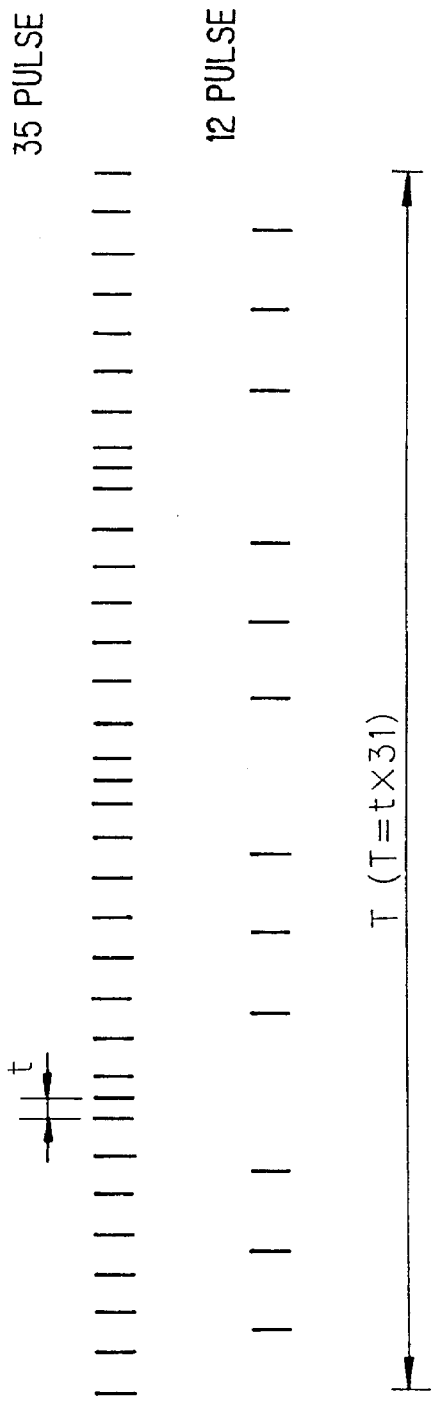
FIG.31(A)
FIG.31(B)

CONTROL METHOD FOR AUTOMATIC SEWING MACHINE AND APPARATUS THEREOF

FIELD OF THE INVENTION

The present invention relates to a control method for an automatic sewing machine and apparatus thereof, in which an X-Y drive unit clamping an article to be sewn in driven is accordance with beforehand stored sewing pattern data, to form seams.

BACKGROUND OF THE INVENTION

FIG. 25 of the attached drawings is a perspective view showing a complete view of a conventional automatic sewing machine. The reference numeral 1 denotes a machine table; 2, a needle bar; 3, a balance; 4, a drive motor; 5, sewing-machine mechanism section for converting rotational movement of the drive motor to vertical movement of the needle bar 2 or swinging movement of the balance 3; and 6, a detector mounted on an end of a spindle (not shown) of the sewing-machine mechanism section 5, for generating a signal in synchronization with rotation of the sewing machine. The detector 6 outputs a synchronizing signal, for example, a needle-lower-position signal in synchronization with every rotation of the sewing machine, and outputs pulse signals (hereinafter referred to as "PG") of a number determined per one revolution or rotation of the sewing machine. The reference numeral 7 denotes a cloth retaining unit for pressing and clamping an article to be sewed; 8, a slide plate; 9, a two-axis drive mechanism for two-dimensionally moving the cloth retaining unit 7 on the slide plate 8 in accordance with a predetermined pattern; 10 and 11, origin detectors for detecting mechanical origins of respective two axes which are arranged in the two-axis drive mechanism 9; and 12, a control unit for generally controlling the operation of each of the above-describe sections.

Arranged on the control unit 12 are power switches 13 and a magnetic memory writing unit (hereinafter referred to as "FDD") 14 which executes reading and writing with respect to a floppy disc (hereinafter referred to as "FD") (not shown). Connected to the floppy disk drive (FDD) 14 are a console panel 15 for setting a sewing pattern, a sewing speed and the like, a start switch 16 for giving a sewing start command, a foot pedal 18 provided with a switch (hereafter referred to as "cloth retaining switch") 17 for pressing and clamping the cloth retaining unit 7, and a stop switch 19 for stopping sewing.

Arranged on the console panel 15 are a liquid-crystal display unit (hereinafter referred to as "LCD") 20 in which information such as procedure of operation, present or current sewing conditions, error massages and the like are displayed on a screen, a reset switch 21 for positioning the two-axis drive mechanism 9 to a predetermined position to reset a system, a test switch 22 for driving the two axes in accordance with the sewing data without rotating the spindle of the sewing machine, a speed setting switch 23 for switching a rotational speed of the drive motor 4 at sewing, and a group of various switches 24 for designating preparation, calling and erasing of predetermined sewing relevant data.

FIG. 26 is a block diagram showing a schematic arrangement of the control unit 12. The reference numeral 27 denotes a microcomputer that is the center of a control circuit; 28, a quartz oscillator for generating a fundamental frequency in order to operate the microcomputer 27; 29, an address latch circuit for latching an address of a memory; 30, a memory data buffer for transmitting data from the memory to the microcomputer 27, or data from the microcomputer 27 to the memory; and 31, a peripheral data buffer for transmitting data from the microcomputer 27 to peripheral elements other than the memory, or from the peripheral elements to the microcomputer 27.

Further, the reference numeral 32 denotes an IC-selective-signal generating circuit (hereinafter referred to as "decoder") which generates various IC selective signals for singly selecting the memory and the peripheral elements; 33, a readable and writable memory element (hereinafter referred to as "RAM"); 34, a non-volatile memory element exclusively for reading (hereinafter referred to as "ROM"); 35, an I/O for controlling various parallel input signals; 36, a motor drive circuit for driving the motor 4 for the sewing machine; 37–39, input interfaces to which various control signals are inputted, for inputting the control signals to the I/O 35; and 40, a stepping-motor driver for receiving feed pulses generated by the microcomputer 27 through the I/O 35, to drive a stepping motor included or contained in the two-axis drive mechanism 9.

Furthermore, the reference numeral 41 denotes a solenoid drive circuit for driving a thread-cutting solenoid 42 and the like; 43, a power circuit for supplying an electric power to the control circuit; 44–49, connectors for executing repetition or junction between various signal lines; 50, a feed-pulse delay circuit (hereinafter referred to as "count-borrowing circuit") for generating timing at which a feed pulse of the microcomputer 27 is generated by data outputted from the I/O 35 and a signal from the detector 6; and 51, an interrupt controller for receiving a signal from the count-borrowing circuit 50 and the detector 6 through the input interface circuit 37 to generate an interrupt signal to the microcomputer 27.

FIG. 27 is a block diagram showing the details of count-borrowing circuit 50. Components and parts applied by reference numerals the same as or identical with those in FIG. 26 have the same functions, and the description of the same or identical components and parts will be omitted here. The reference numeral 52 denotes a down counter for counting PG signals from the detector 6 and the signal from the I/O 35; 53, an OR circuit for preventing a borrowing signal from being generated when the counter is cleared; and 54, a latch circuit (flip-flop circuit) for latching a BR signal outputted from the down counter 52.

FIG. 28 is an example of a circuit which is capable of being arranged in substitution for the count-borrowing circuit 50 illustrated in FIG. 27. The reference numerals 55 and 56 denote AND elements; 57 and 58, flip-flop circuits; and 59 and 60, one-shot circuits. The reference numeral 61 denotes a preset type down counter; 62, an up counter; 63 and 64, module counters; 66, a PG signal from the detector 6; 67, a needle-lower-position signal from the detector 6; 68, a reset signal; 69-X and 70-Y, movement data in an X-direction and a Y-direction outputted from the I/O 35; and 71 and 72, stepping-motor drive command signals (hereinafter referred to as "pulses") outputted from the module counters 63 and 64.

FIG. 29 is a part of an internal circuit of the stepping-motor driver 40 for driving a pair of stepping motors 25 and 26, which is a drive circuit for driving one of windings, that is, an A-phase winding 85 of windings of the stepping motor 25. The reference numeral 73 denotes an XAP signal for generating a signal when current flows through the A-phase winding 85 in a direction indicated by a one-dot-and-chain line 86; and 74, an XAN signal for generating a signal when current passes in a direction of the A-phase winding 85 in a direction indicated by the broken line.

Moreover, the reference numerals 76 and 78 denote base drive circuits for driving a pair of transistors 82 and 84, respectively; 80, a shunt resistor for detecting current flowing through the A-phase winding 85; 79, an error amplifying circuit for amplifying a difference between a value of the current detected by the shunt resistor 80 and a requisite current value; 75 and 77, comparators for applying a shopper signal to a pair of transistors 81 and 83, based on a difference amplified by the error amplifying circuit and command values of the XAP signal and the XAN signal. A base drive circuit is included for driving bases of the respective transistors 82 and 84.

Operation of the conventional automatic sewing machine as described above will be described. In this connection, the detailed operation of circuit views in FIGS. 25–28 has been described in detail in Japanese Patent Publication No. SHO 60-29515 and Japanese Patent Publication No. SHO 60-54076 and the description thereof will be omitted here. The stepping-motor driver and a feed system will hereunder be described.

Operation of the stepping-motor driver will be describe with reference to FIGS. 29 and 30. First, a case where current flows through the A-phase winding 85 in a direction indicated by the one-dot-and-chain lines 86 will be described. In case where the XAP signal is 1, and the XAN signal is 0, the transistors 81 and 84 are turned ON so that current flows from a power source 90 to the transistor 84 through the A-phase winding 85, and current flows through the shunt resistor 80. At this time, a voltage value corresponding to the current is generated at a point C of the shunt resistor 80.

A difference between the voltage value at the point C and the voltage value at the point B 89 is amplified by the error amplifier 79. If the voltage at the point B 89 is in agreement with the voltage at the point C, an output A 88 from the error amplifier 79 is brought to 0 so that the transistor 81 is turned OFF by the circuit 75 having incorporated therein the comparator. After the transistor 81 has been turned OFF, the current continues to flow by a reactance part and a resistance part of the motor per se in spite of the fact that the transistor 81 is turned OFF. However, the current soon begins to fall or descend gradually.

When the current falls and the voltage at the point C is lowered to less than the voltage at the point B, the output A 88 from the error amplifier 79 is not brought to 0, but increases in a direction of plus. Thus, the circuit 75 having incorporated therein the comparator turns ON the transistor 81. By continuation of the above-description operation, the current in the direction indicated by the one-dot-and-chain line 86 flows constant. Operation of the broken lines 87 that is the direction of the current flowing through the A-phase winding is the same as the case of the one-dot-and-chain line 86, and the description thereof will be omitted.

FIG. 30(A) is a diagrammatic view for explanation of a two-phase stepping motor which is composed of an A-phase winding, a B-phase winding and a rotor. The direction of the current in FIG. 29 is such that the one-dot-and-chain line 86 is indicated by XAP in FIG. 30(A), while the broken line 87 is indicated by XAN. Further, although the B-phase winding has not been described, a circuit equivalent to that illustrated in FIG. 29 actually exists also in the B-phase winding so that the current that is XBP and XBN flows.

Here, a case of two-phase excitation illustrated in FIG. 30(B) will be described. XAP is excited in a step 1. That is, current flows in a direction indicated by $I_1$ in FIG. 30(D). Next, XBP is excited in a step 2. That is, a torque is generated in a direction indicated by 13 in FIG. 30(D). At the step 3, XAN is excited so that a torque is generated in a direction indicated by 15 in FIG. 30(D). At a step 4, XBN is excited to generate a torque in a direction of $I_7$ in FIG. 30(D). After the step 4, a program is also returned to the step 1 so that the current flows while the direction of the torque successively is moved angularly or rotates. Here, the arrangement is generally such that an angle 90° between XAN and XBP expressed diagrammatically is 1.8° by an arrangement of the winding of the stepping motor.

Next, 1–2 phase excitation will be described. As shown in FIG. 30(C), at a step 1, XAP is excited to generate the torque in the direction $I_1$ in FIG. 30(D). Next, at a step 2, XAP and XBP are excited to generate the torque in the direction $I_2$. Consequently, the direction of the torque successively rotates like $I_1 \rightarrow I_2 \rightarrow I_3 \rightarrow I_4 \rightarrow I_5 \rightarrow I_6 \rightarrow I_7 \rightarrow I_8 \rightarrow I_1$ in FIGS. 30(C) and 30(D), whereby the stepping motor rotates. Here, it will be understood or appreciated that, assuming that operation is made through 1.8° by a single excitation change in case of 2 phase excitation, then operation will be made through 0.9° in case of the 1–2 phase excitation. By this arrangement, driving of the X-Y table is executed, and the 2-axis drive mechanism 9 is arranged such that the X-Y table operates through 0.2 mm at 0.9°. Next, two (2) methods of driving the two-axis drive mechanism at feed will be described.

① First Drive Method

A first drive method is a drive method in case where the circuit illustrated in FIG. 28 is used. This feed method will be described with FIG. 31(A) and FIG. 31(B) used. Generally, the pair of module counters 63 and 64 have fundamental pulses as illustrated in FIG. 31(A). In case where it is desired to output three (3) pulses, locations at 1 and 2 of the fundamental pulses are outputted. FIG. 31(B) is a figure showing a typical example thereof, illustrating both cases where thirty-five (35) pulses are outputted and where twelve (12) pulses are outputted. In the case of thirty-five (35) pulses, 32, 2 and 1 of the fundamental pulses are outputted, while, in the case of twelve (12) pulses, 8 and 4 of the fundamental pulses are outputted. It is to be noted here that, in a case where the module counters 63 and 64 are used, the same period of time is required in case where one pulse is outputted and in case where sixty-two (62) pulses are outputted, as illustrated in FIG. 32.

② Second Drive Method

As a second drive method, there is a drive method in case where the circuit illustrated in FIG. 27 is used. This method is a method in which pulses are outputted every predetermined cycle by software. In FIG. 33(A), in the case where feed is executed from V to W, movement is made in a direction β illustrated in FIG. 33(A) in the first drive method. outputting of the pulses at this time is illustrated in FIG. 33(C). On the other hand, in the second drive method, movement is made in a direction α. This is such that a required number of the pulse outputs between V and W is first computed, feed subsequently starts simultaneously for the X-axis and the Y-axis, and a short one is completed early, whereby a uniform pulse arrangement is given both for the X-axis and the Y-axis. This is shown in FIG. 33(B).

Since the conventional control apparatus for the automatic sewing machine has been constructed as described above, the following problems have arisen. That is, in the drive method in case where the circuit illustrated in FIG. 28 is used, the pulses move linearly as indicated by β in FIG. 33(A), but the pulses are not outputted uniformly in time.

Further, since the cycle T is constant, stepping-out occurs if the speed of the two-axis drive mechanism rises.

Furthermore, the drive method in case where the circuit illustrated in FIG. 27 is used has the following problem. That is, movement does not occur linearly until an objective or intended location as indicated by α in FIG. 33(A). Moreover, since the two-axis drive mechanism is driven at a constant or predetermined speed, stepping-out occurs at a point where the two-axis drive mechanism starts to operate and a point where the two-axis mechanism stops. Further, in case where the two-axis drive mechanism is driven at a high speed, the following problem arises. That is, in spite of the fact that the movement command pulses are outputted uniformly, weight and friction of the two-axis drive mechanism cause actual movement of the two-axis drive mechanism to oscillate like an actual movement curve. By this oscillation, stepping-out occurs.

Furthermore, there is also the following problem. Specifically, in case where a cylinder and the like are loaded on the cloth retaining frame as occasion demands, since their weight is heavy, the oscillation in FIG. 34 increases more than in the case where their weight is light. The vibration can become too excessive under this overload condition because the stepping motor does not provide feedback control thus resulting in a loss of control. This phenomenon is referred to as stepping out.

Moreover, the following problem also arises. That is, in the 1–2 phase excitation as shown in FIG. 30(D), ripple of the torque occurs. For this reason, the stepping motor oscillates so that stepping-out occurs.

Further, the following problem also arises. That is, generally, the stepping motor has such a characteristic that an increase in rotational speed reduces the torque. Thus, stepping-out occurs.

SUMMARY OF THE INVENTION

It is therefore an object of the invention to provide a control apparatus for an automatic sewing machine, in which a two-axis drive mechanism is driven at a high speed and moves linearly to an objective location, and driving of the two-axis drive mechanism having no stepping-out is realized, whereby an improvement in a working speed and an improvement in operability can be realized.

Preferably, a D/A converter is used in the control means for controlling exciting the current passing through the motor for driving the two-axis drive mechanism.

Specifically, the control apparatus for the automatic sewing machine according to the invention controls such that the drive mechanism moves along the X-axis and the Y-axis at a speed slower than the maximum speed at movement start and movement completion of feed.

Further, the amounts of movement of the drive mechanism along the respective X-axis anti Y-axis are judged or discriminated. An axis which has a small amount of movement is controlled later or slower than the maximum speed. The amounts of movement are controlled so as to be brought to a uniform amount of movement.

Further, the amount of movement of the drive mechanism along the respective X-axis and Y-axis are discriminated. The drive method is altered or changed depending upon a ratio between a larger one and a smaller one of the amount of movement.

Moreover, the control apparatus comprises the means for computing the point of inflection. Control is made such that, before and after the point of inflection, the drive mechanism along the X-axis and the Y-axis moves at a speed slower than the movable maximum speed.

Further, control is made such that, in case where the difference of the ratio between the amounts of movement of the drive mechanism along the respective X and Y axes before and after the point of inflection is equal to or less than a predetermined amount, control is made such that the two-axis drive mechanism is driven at the maximum speed.

Furthermore, control is made such that the drive mechanism along at least one axis is driven at a speed slower than the maximum speed on the side of the axis driven at the maximum speed.

Moreover, the control apparatus for the automatic sewing machine operates such that the maximum speed of the two-axis drive mechanism is lowered in interlocking relation to the selection of a switch position when the heavy load is loaded.

Further, control is made such that the method of exciting the drive motor for the two-axis drive mechanism is altered or changed.

Furthermore, the current flowing through the motor for driving the two-axis drive mechanism is controlled.

According to the invention, since a the speed of the drive mechanism at the time the movement at feed starts and at the time the movement is completed are slower than the maximum speed, there is produced an advantage that there is no case where the two-axis drive mechanism is stepped out.

Moreover, since the side of the axis in which the amount of movement of the drive mechanism along the X-axis or the amount of movement along the Y-axis is small at feed is brought to a uniform amount of movement at feed, even if two axes are driven simultaneously, stepping-out does not occur so that the feed can be completed through a desired path.

Further, by using a ratio between the axis in which the amount of movement is large at feed and the axis in which the amount of movement is small at feed, the drive method is altered whereby it is possible to restrain oscillation of the stepping motor and to prevent stepping out.

Furthermore, since the point of inflection is found during no-load feed, and the stepping motor is controlled slower than the maximum speed in front of and behind the point of inflection, it is possible to prevent stepping out at the point of inflection. Moreover, when using a microcomputer whose computation speed is late or slow, it is possible to eliminate the computation time.

Further, in case where the ratio between the amount of movement of the drive mechanism along the X-axis and the amount of movement along the Y-axis is less or small at feed, the two-axis drive mechanism is controlled at the maximum speed. Accordingly, the feed can be executed without the speed being not lowered or slowed at an unnecessary location.

Furthermore, at least one location on the side of the axis where the two-axis drive mechanism is driven at the maximum speed at the feed is driven at a speed slower than the maximum speed of the two-axis drive mechanism, whereby vibration or oscillation of the two-axis drive mechanism can be restrained, stepping out can be prevented, and the two-axis drive mechanism can be driven at a high speed.

Moreover, the speed of the feed is lowered in interlocking with a switch position which is selected in a case where the heavy load is loaded on the two-axis drive mechanism, whereby the feed can be executed even in case where the heavy load is loaded onto the two-axis drive mechanism, without stepping out.

Further, the excitation method of the driving motor for the two-axis drive mechanism is altered whereby it is possible to lengthen the interrupt time. Thus, it is possible to reduce the cost of the apparatus by the use of a microprocessor which is not high in speed, so that there still can be produced apparatus which is high in accuracy.

Furthermore, the current flowing through the stepping motor is controlled whereby accuracy is improved, and it is possible to drive the stepping motor with a constant or predetermined torque. Thus, accuracy of the two-axis drive mechanism can be improved, and the two-axis drive mechanism can be driven without stepping out, without alteration of the two-axis drive mechanism.

Moreover, since the analog switch is used to control the current passing through the motor which drives the two-axis drive mechanism, it is possible to manufacture a control apparatus which is low in cost and which is stable.

Further, since means is provided for controlling the exciting current passing through the drive motor for the two-axis drive mechanism, there can be obtained stable driving without stepping out even in a high-speed rotating area or range.

Other object and features of this invention will become understood from the following description with reference to the accompanying drawings.

BRIEF DESCRIPTION OF THE DRAWINGS

FIGS. 4(A)–4(E) show waveforms of pulse sending-out;

FIGS. 7(A), 7(B) and 7(C) are views of tables showing pulse spacing of both an X-axis and a Y-axis;

FIGS. 8(A) and 8(B) are views for explanation showing the waveforms of pulse sending-out;

FIG. 10 is a view of tables showing the number of pulses for sending out the pulses, according to the invention;

FIGS. 14(A) and 14(B) are views for explanation showing tables for sending out the pulses, according to the invention;

FIG. 15 is a view for explanation showing waveforms of pulse sending out, according to the invention;

FIGS. 21(A), 21(B) and 21(C) are view for explanation showing a table for a pulse output of an X-axis, according to the invention;

FIGS. 30(A), 30(B), 30(C) and 30(D) are views showing a theory of 2 phase and 1–2 phase excitation of the conventional stepping-motor driver;

FIGS. 31(A) and 31(B) are views showing conventional pulse-output waveforms;

DESCRIPTION OF THE EMBODIMENTS

Various embodiments of the invention will hereunder be described with reference to the accompanying drawings.

Figure 1:
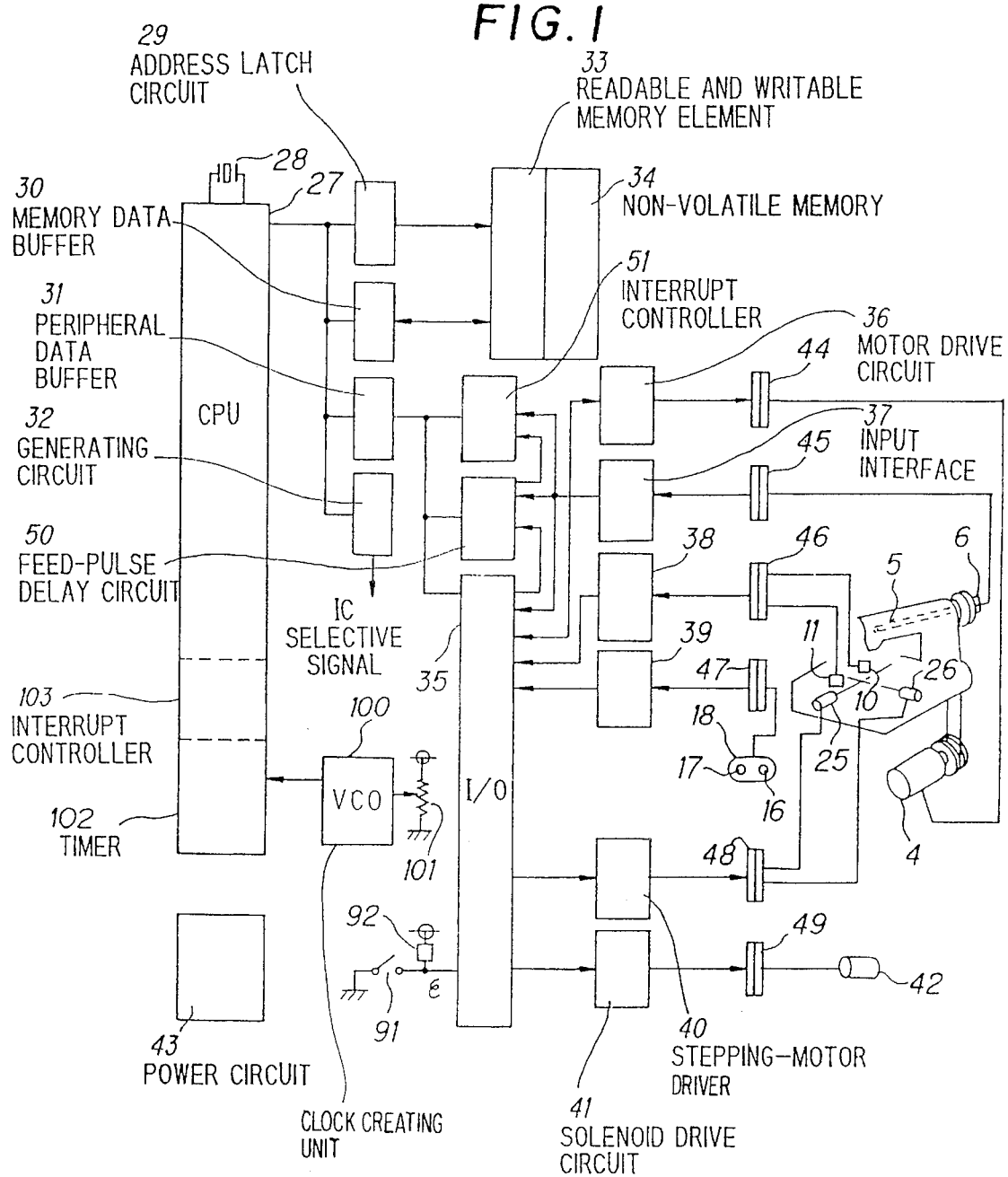
FIG. 1 is a block diagram showing an arrangement of a control apparatus for an automatic sewing machine, according to the invention.

Referring first to FIG. 1, there is shown, in a block diagram, a circuit arrangement of a control apparatus for an automatic sewing machine, according to the invention. The same or identical reference numerals are applied to components and parts the same as or identical with those of the conventional example, and the description thereof will be omitted.

In FIG. 1, the reference numeral 100 denotes a clock creating unit (hereinafter referred to as "VCO") for giving a predetermined frequency to a timer 102 within a CPU 27. The VCO 100 can change or alter the frequency by a frequency regulating varistor 101. The reference numeral 102 denotes a timer arranged within the CPU 27, which can divide the clock from the VCO 100 with a free dividing ratio by a command from the CPU 27 so as to be capable of giving interruption to an interrupt controller 103; and 103, an interrupt controller arranged within the CPU 27, which controls interruption of an interrupt controller 51 on the outside of the CPU 27, interruption of the interrupt timer 102, and the like.

Figure 2:
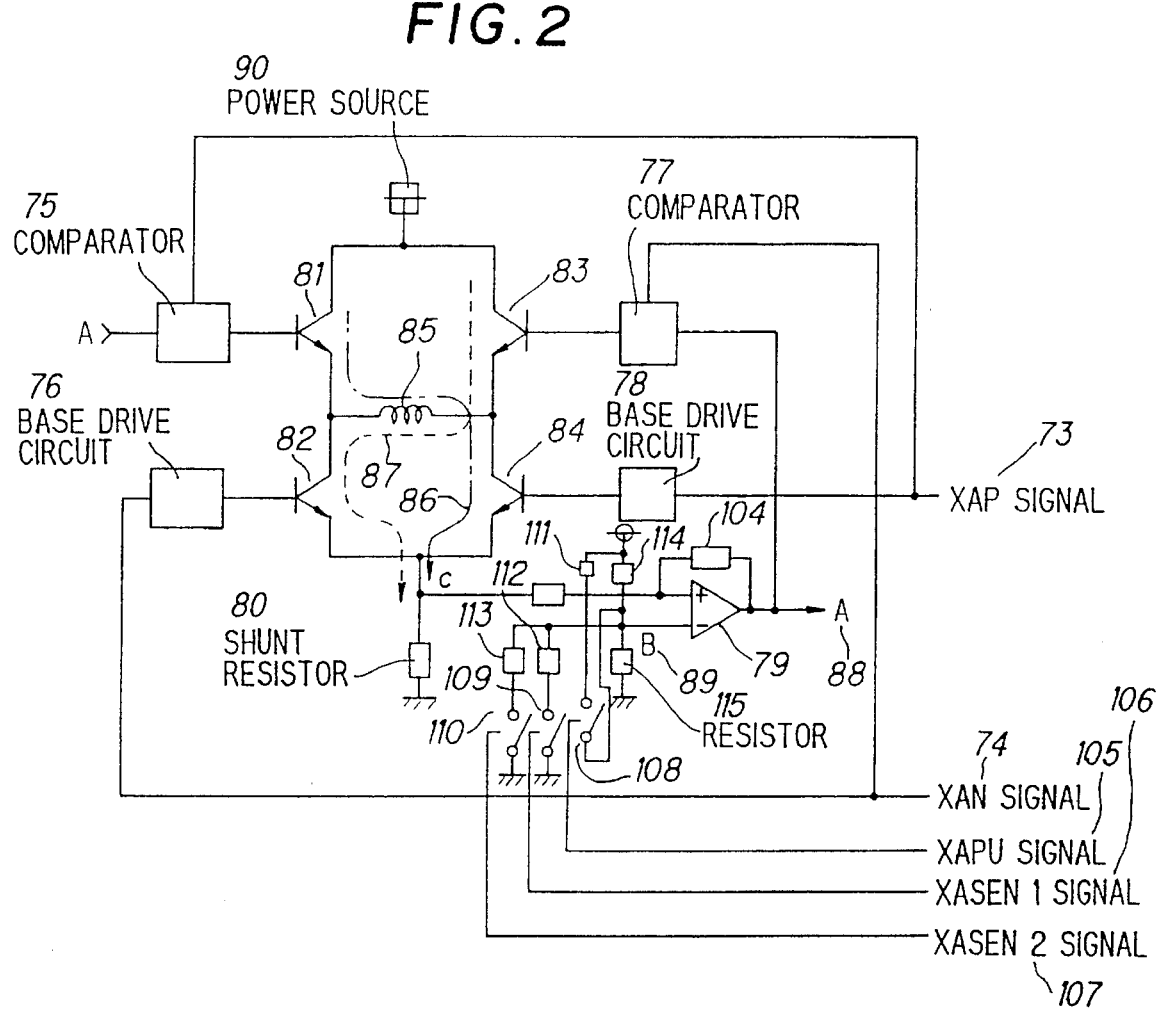
FIG. 2 is a block diagram showing a portion or part of a circuit arrangement of a pulse motor driver according to the invention.

FIG. 2 is a block diagram of a portion or part within a stepping motor driver in the circuit block diagram illustrated in FIG. 1. In FIG. 2, the same or identical reference numerals are applied to components and elements the same as or identical with those of the conventional example, and the description thereof will be omitted. In FIG. 2, the reference numeral 105 denotes an XAPU signal for increasing exciting current flowing through the stepping motor as a whole; 106 and 107, XASEN 1 and 2 signals, respectively, for decreasing the exciting current flowing through the stepping motor; 108–110, analog switches operated by the XAPU signal 105, the XASEN 1 signal 106 and XASEN 2 signal 107, respectively; 111–113, resistors for determining amounts of increase or decrease of the exciting current, respectively; and 114 and 115, resistors for determining standard exciting current.

Figure 3:
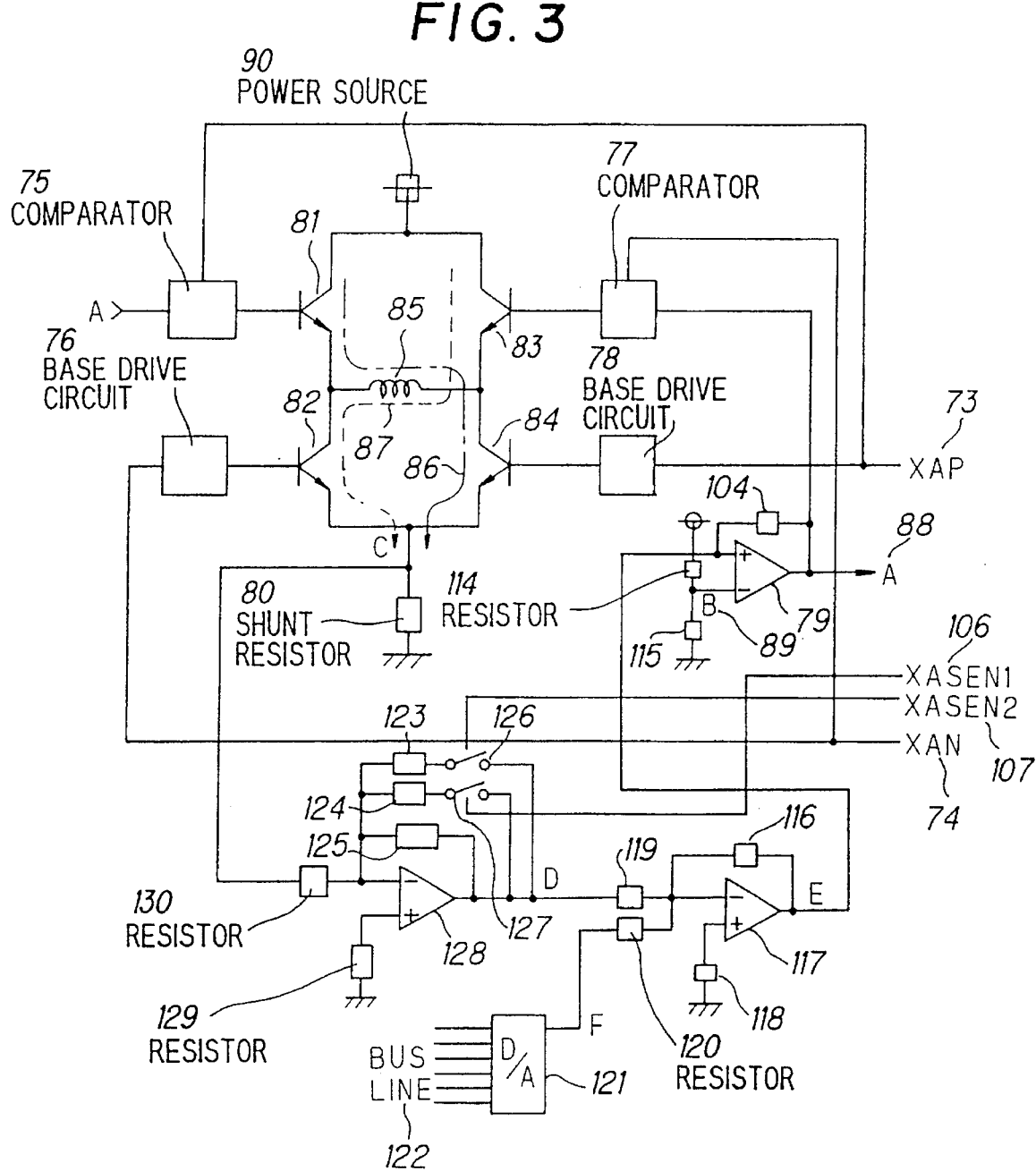
FIG. 3 is a view for explanation showing a waveform determining a cycle of interruption according to the invention.

FIG. 3 is a circuit block diagram showing another embodiment of a portion within the stepping motor driver in the circuit block diagram illustrated in FIG. 1. Components and parts illustrated in FIG. 3 perform the same or identical advantages and functions of those illustrated in FIG. 2. In FIG. 3, the same or identical reference numerals are applied to components and parts the same as or identical with those of the conventional example, and the description thereof will be omitted. In FIG. 3, the reference numeral 117 denotes an add amplifier circuit for adding the output signal from a D/A converter 121 and a value at a point D to each other to amplify an added value; 119, 120, 116 and 118, resistors for determining an amplification factor of the add circuit 117; 128, a circuit for amplifying voltage at a point C; 121, a D/A converter operating in direct coupling to a bus line of the CPU, which converts a digital signal to an analog signal; 128, an amplifier circuit hose amplification factor is determined by a ratio among resistors 130, 125 and 129; 126 and 127, analog switches operated in response to signals including the XASEN 1 signal 106 and the XASEN 2 signal 107; and 123 and 124, resistors for altering the amplification factor of the amplifier 128 for altering the exciting current flowing through the stepping motor.

Figure 20:
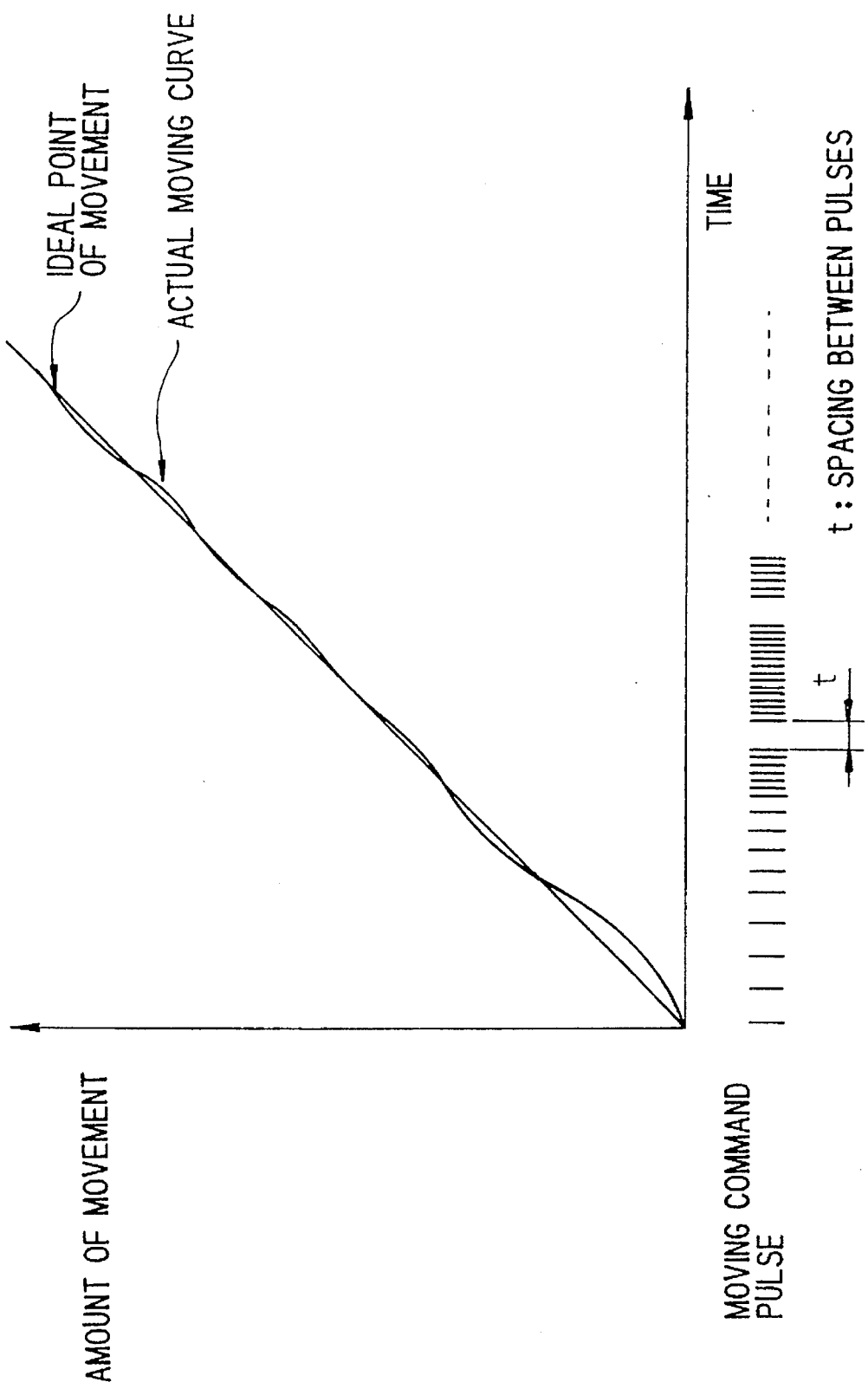
FIG. 20 is a view for explanation showing the pulses and moving waveforms of the two-axis drive mechanism at the time processing of the point of inflection and τ are inserted.

Next, operation of the automatic sewing machine constructed as described above will be described. In this connection, an outer appearance of the automatic sewing machine according to the invention is similar in view to that according to the background art, and various operations will hereunder be described also with FIG. 20 illustrating the background art used together.

① Method of generating pulses used as drive command signal

First, FIG. 1 and FIG. 4 are used to describe a method of generating pulses which are used as a drive command signal to the stepping motor. In FIG. 1, a rectangular wave indicated in FIG. 4A is generated at the output from the VCO 100 by the VCO 100, at a frequency regulated by resistor 101. The CPU 27 commands the division ratio to the timer 102 within the CPU 27. In case, for example, where the division ratio is 2, the timer 102 divides the waveform of FIG. 4(A) to that like a waveform of FIG. 4(B). The timer 102 commands interrupt generation to the interrupt controller 103 every rise of the timer 102. This circumstance or status is illustrated in FIG. 4(C). Further, FIG. 4(D) shows an example where the timer 102 is divided into four (4). As shown in FIG. 4(E), the interrupt timing is brought to a half speed as compared with FIG. 4(C). Furthermore, this interrupt cycle can be changed to other values by regulation of the frequency by variable resistor 101.

② Method of driving two-axis drive mechanism

Figure 5:
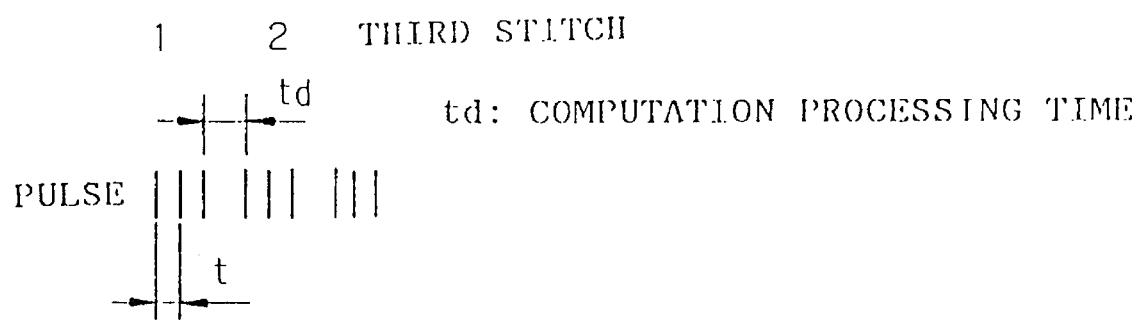
FIG. 5 is a view showing the waveform of pulse sending-out.
Figure 26:
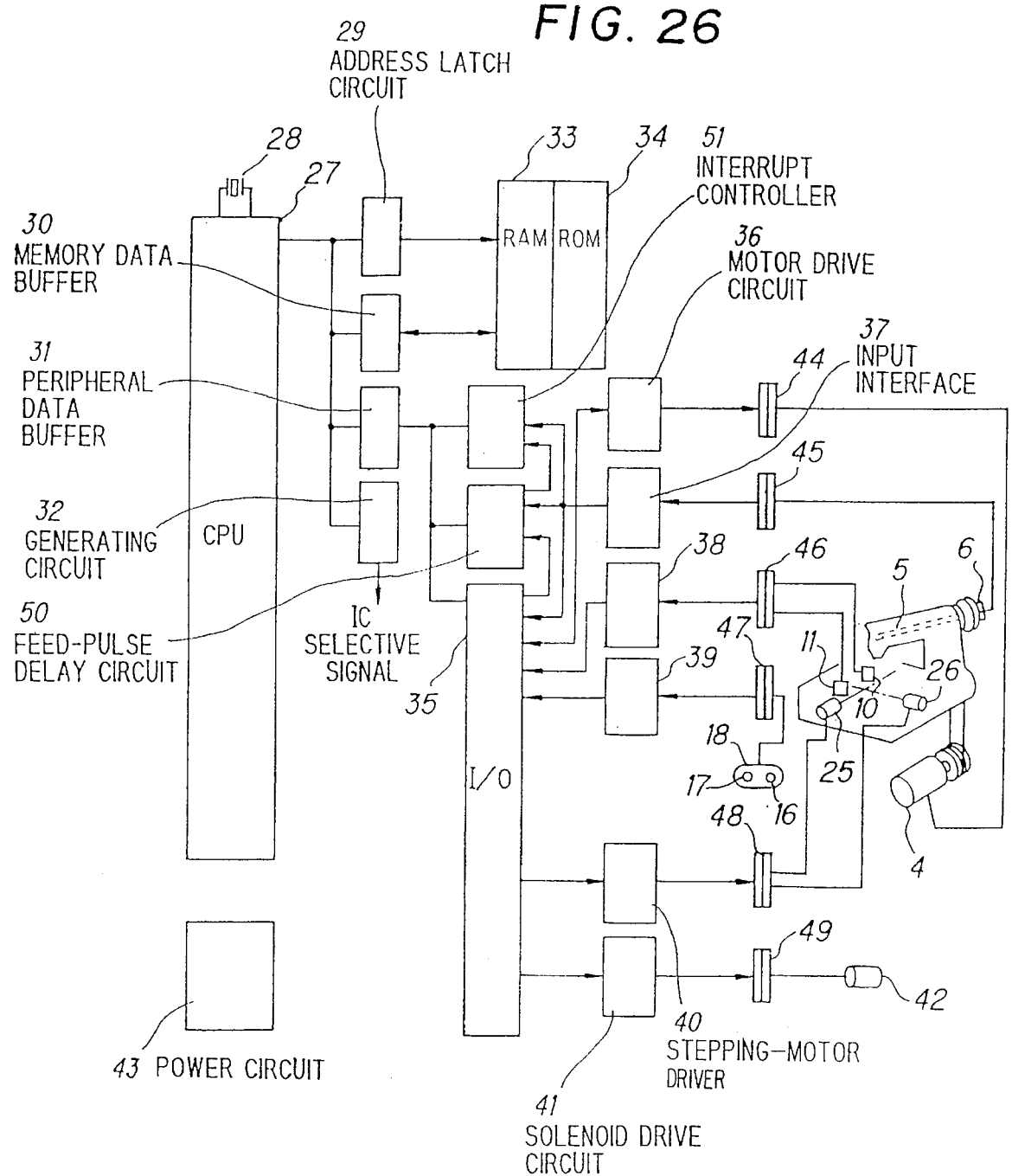
FIG. 26 is a block diagram showing an arrangement of a conventional automatic sewing machine.
Figure 27:
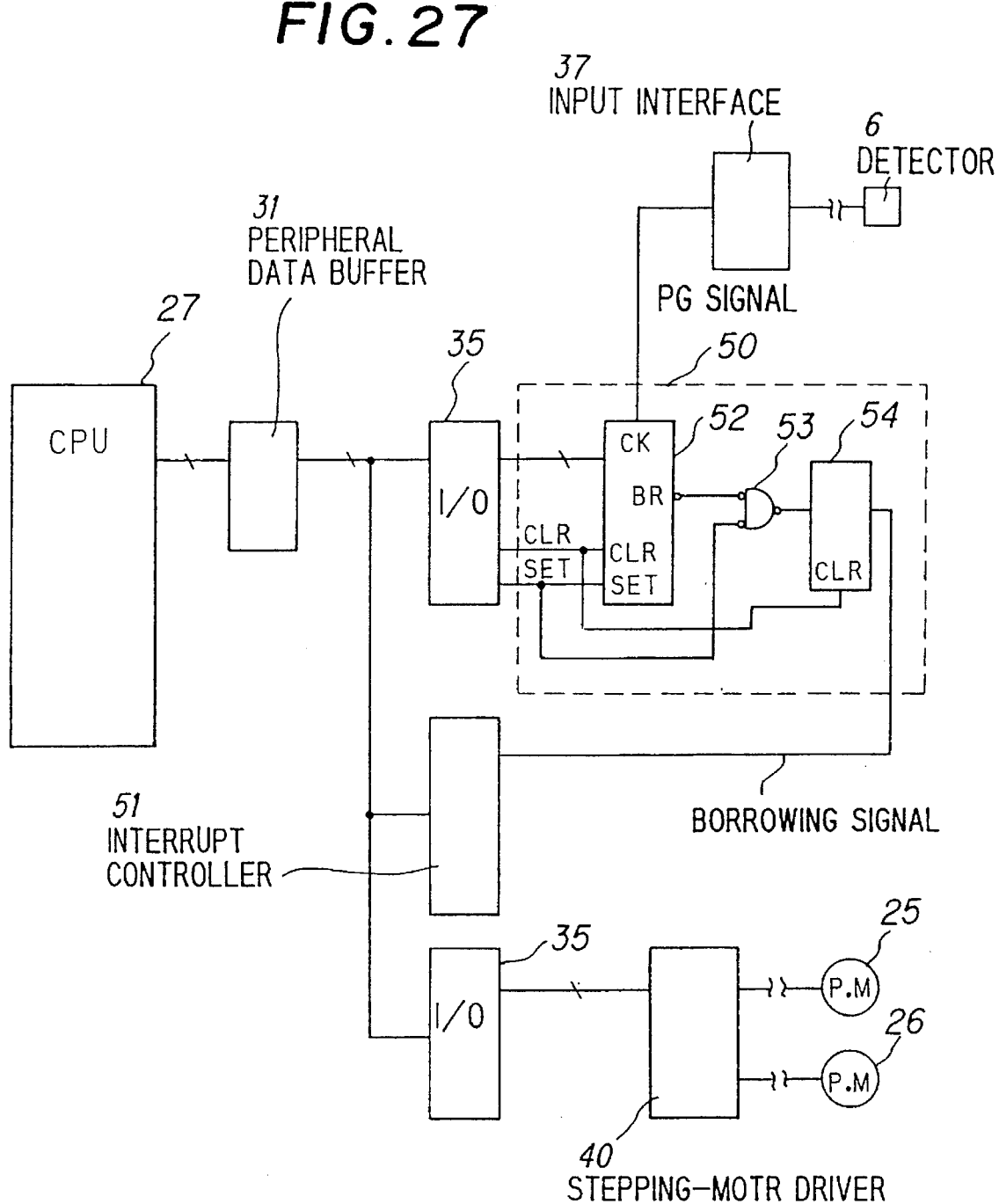
FIG. 27 is a block diagram showing a conventional circuit arrangement for sending out pulses.
Figure 28:
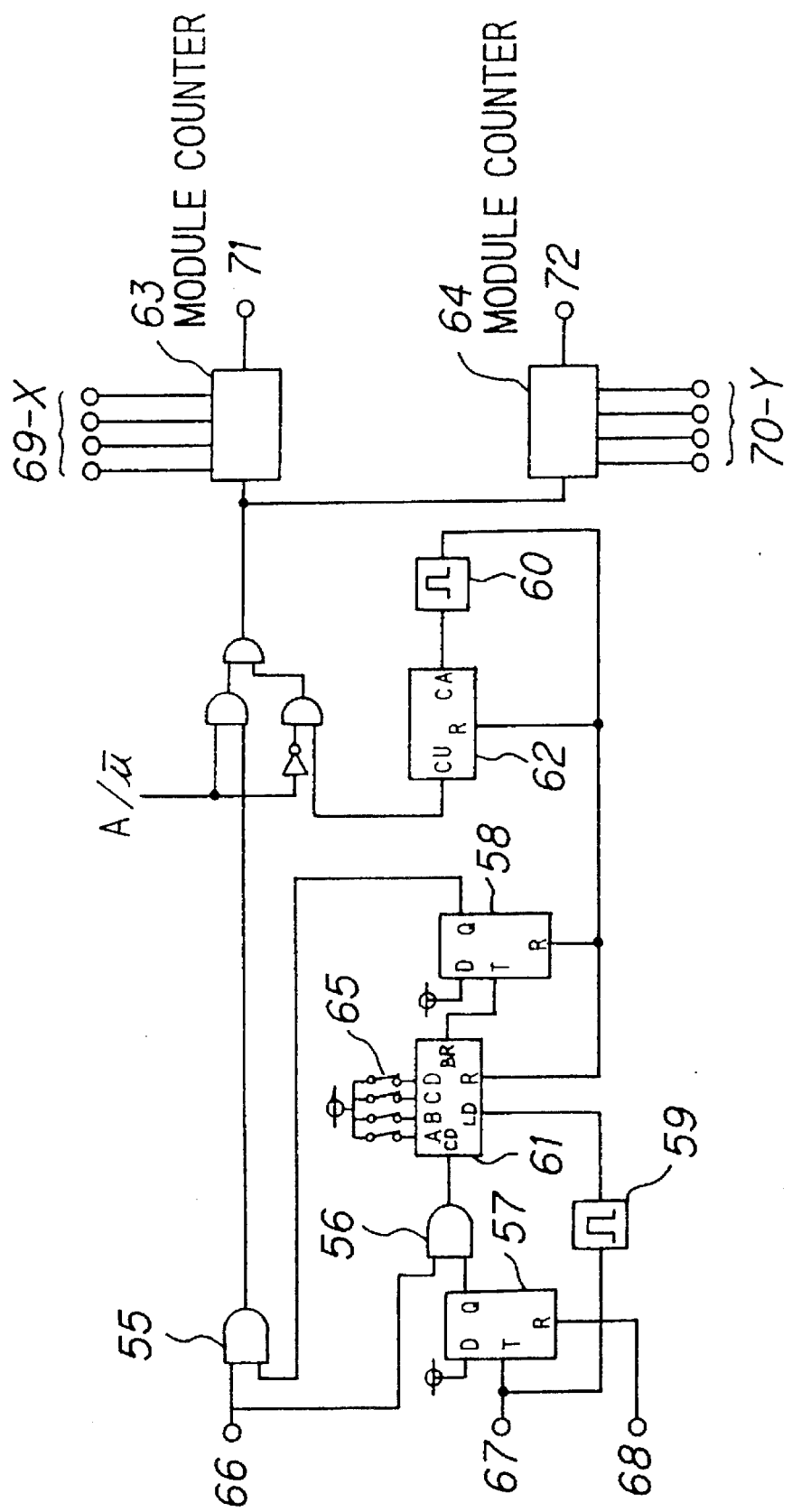
FIG. 28 is a block diagram showing a conventional circuit arrangement for sending out pulses.
Figure 29:
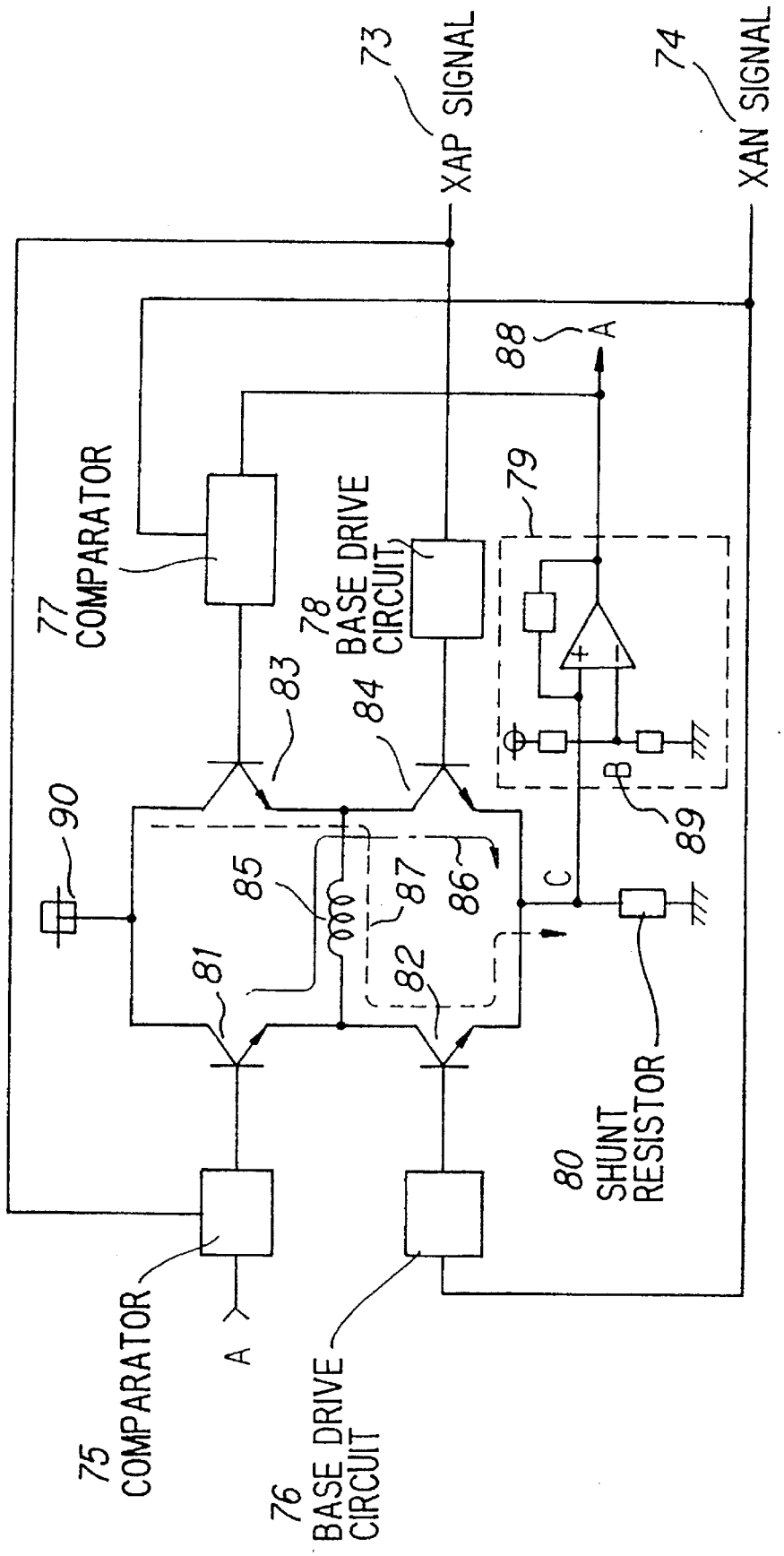
FIG. 29 is a block diagram showing a portion of a conventional circuit of stepping-motor driver.
Figure 32:
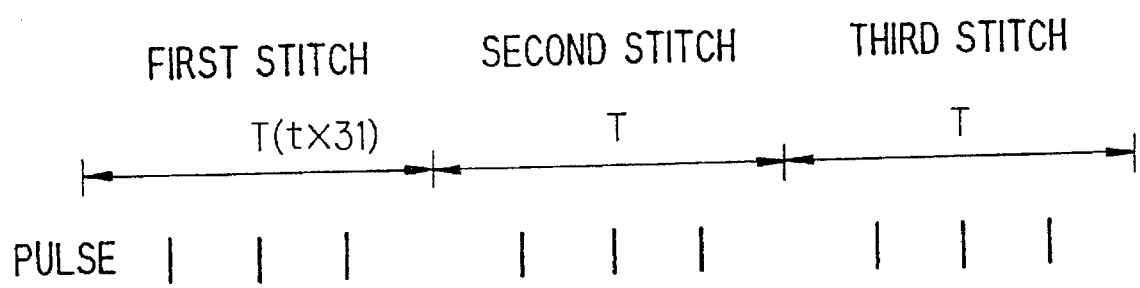
FIG. 32 is a view for explanation showing a conventional pulse-output waveform.
Figures 33A, 33B, 33C:
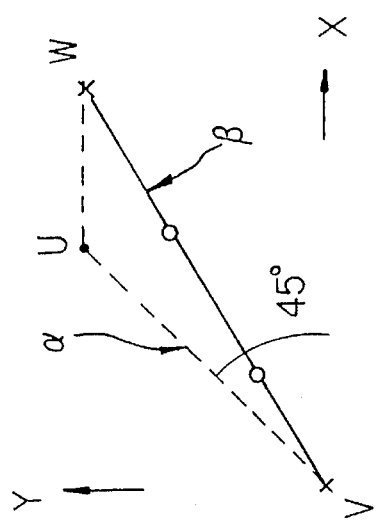
FIGS. 33(A), 33(B) and 33(C) are views showing a conventional two-axis drive direction and conventional pulse-output waveforms.

A method in which the two-axis drive mechanism is operated by utilization of the aforesaid interruption will next be described. FIG. 5 shows an example thereof, and pulses are equivalent to those (refer to FIG. 32) sent out in the circuit illustrated in FIG. 26 in the conventional example. A case where pulses are sent out only for movement along the X-axis will be described. Period t in FIG. 5 is the same selected period t illustrated in FIG. 4(C); it is the cycle with which the interrupt is entered. Specifically, in FIG. 5, the pulses are outputted at a minimum interrupt period. By contrast, a large period td in FIG. 5 is the computation time required for executing treatment of a single stitch. Accordingly, in the case where processing for each stitch is first executed to perform feed, intervals or spacings between the computation times exist(s).

Figure 6:
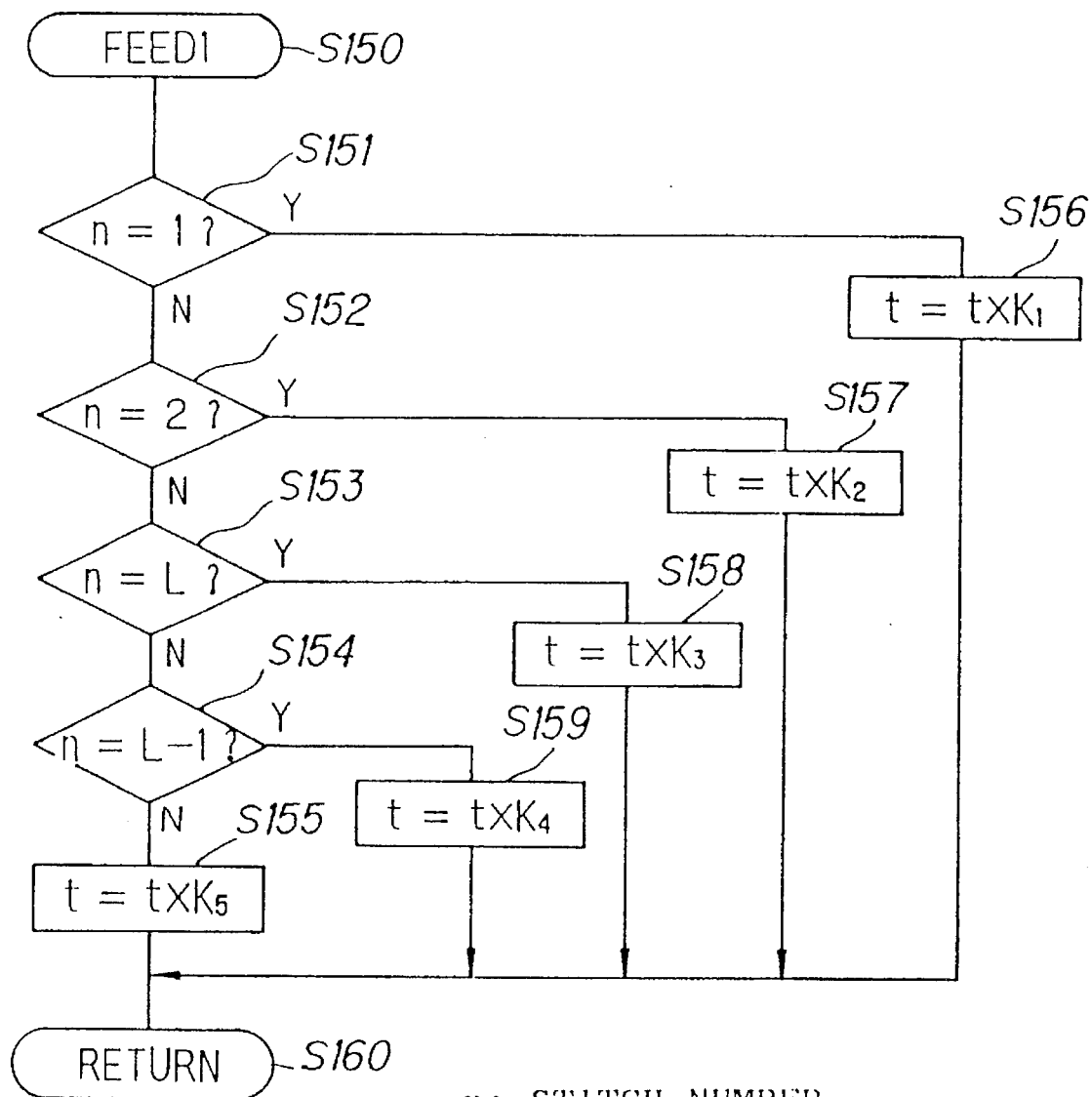
FIG. 6 is a flow chart showing operation determining a method of sending out pulses, according to the invention.

A case where processing for each stitch is executed to perform feed will now be described. FIG. 6 is a flow chart for charging the period where certain stitches, and a second stitch starting the feed and the last single stitch in the feed and a stitch prior thereto, are slower than the period for maximum speed. In this connection, a case where the drive mechanism operates along only one axis, that is either one of the X-axis and the Y-axis, will be described here for simplification.

In case where a FEED 1 is called from a main routine (not shown), the FEED 1 in FIG. 6 is executed (S150). First, it is judged whether or not the stitch is the first stitch (S151). If the stitch is the first stitch, a value of $t \times K_1$ is entered into the value of t (S156), and the program is returned to the main routine (S160). On the other hand, if it is judged at the step S151 that the stitch is not the first stitch, it is judged whether or not the stitch is the second stitch (S152). If it is judged that the stitch is the second stitch, a value of $t \times K_2$ is entered into the value of t (S157), and the program is returned to the main routine (S160). In case where it is judged at the step 152 that the stitch is not the second stitch, it is judged whether or not the stitch is the final stitch (S153). Here, if it is judged that the stitch is the final stitch, a value of $t \times K_3$ is entered into the value of t (S158), and the program is returned to the main routine (S160). Where it is judged at step S153 that the stitch is not the final stitch, it is judged whether or not the stitch is a single stitch prior to the final stitch (S154). Here, if it is judged that the stitch is a single stitch prior to the final stitch, a value of $t \times K_4$ is entered into the value of t (S159), and the program is returned to the main routine (S160). On the other hand, in case where the stitch is not prior to a final stitch, a value of $t \times K_5$ is entered into the value of t (S155), and the program is returned to the main routine (S160).

Subsequently, in the main routine, execution of the feed is performed by the value of t inputted at FIG. 7(A). Examples of specific pulse output regarding cases of $K_1=2$, $K_2=1$, $K_3=2$, $K_4=1$ and $K_5=1$ are illustrated in FIG. 8(A). Specific examples in cases of $K_1=3$, $K_2=2$, $k_3=3$, $k_4=2$ and $K_5=1$ are illustrated in FIG. 8(B).

FIG. 8(A) shows a case where the number of stitches of the feed is four (4) stitches, and $K_1$ and $K_3$ are brought to $t=t \times 2$. Specifically, a pulse having two-time pulse spacing or separation is added to the first single stitch and the final single stitch. Further, in case of FIG. 8(B), the first stitch and the sixth stitch are brought to $t=t \times 3$. Specifically, the pulse separation is brought to three-time pulse separation. Furthermore, the second stitch and the first stitch are brought to t=t×2. Specifically, the pulse separation is brought to two-time pulse separation. The third stitch and the fourth stitch are brought to t=t×1. specifically, the pulse separation is brought to one-time pulse separation. This means that, if the case of t=t×1 is assumed to be the maximum speed of the feed, a pulse slower in speed than the maximum speed is entered into the first and the last of the feed. In FIGS. 8(A) and 8(B), td indicates computation processing time. This time is a delay time between pulses in adjacent stitches where the pulse is sent out one stitch by one stitch.

③ Method of sending out pulses in case where the drive mechanism operates along the X-axis and Y-axis simultaneously Next, a method of sending out pulses in the case where the drive mechanism operates along the X-axis and the Y-axis simultaneously at feed will be described.

First Method

Figure 9:
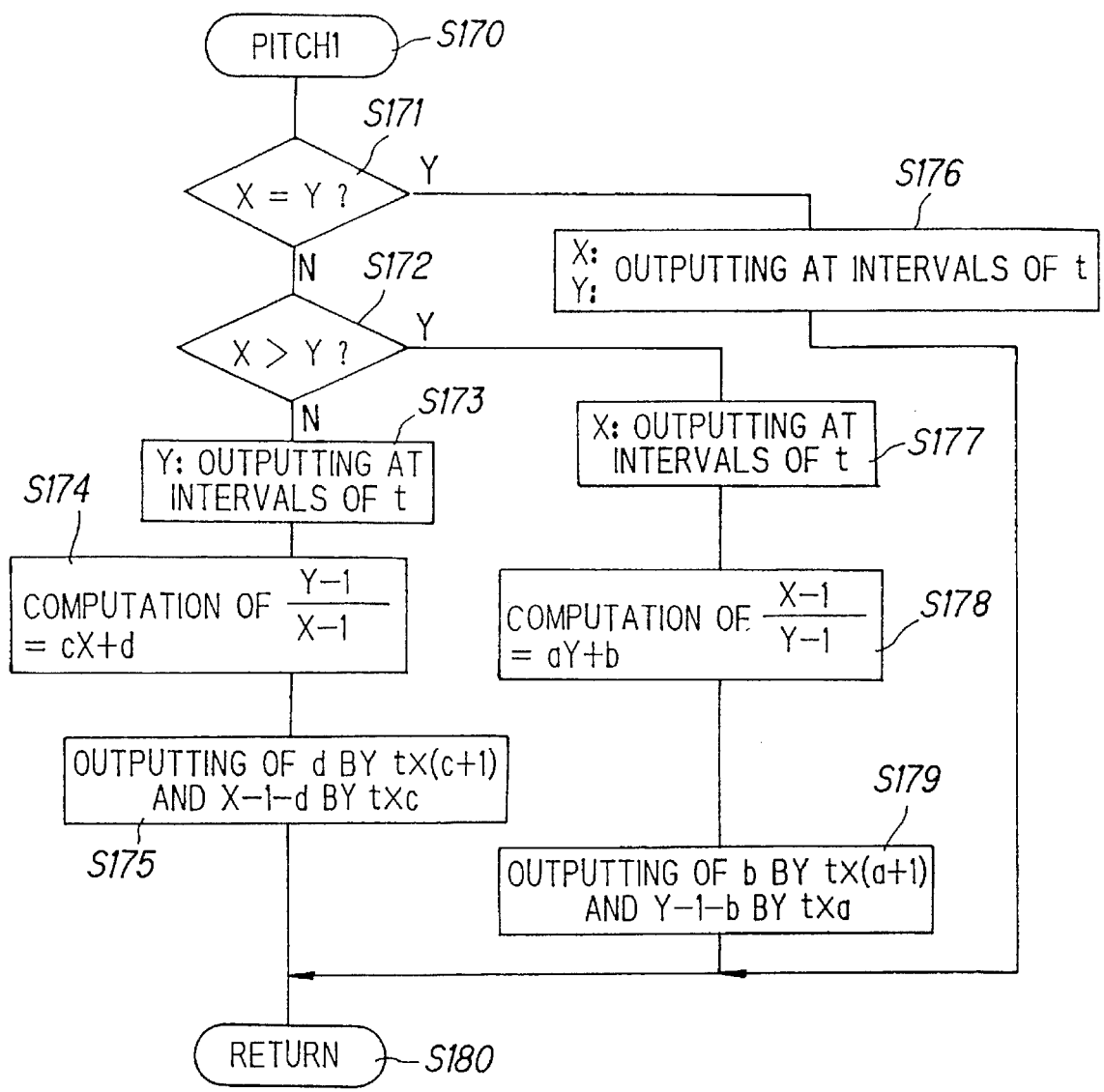
FIG. 9 is a flow chart showing operation for determining a method of sending out the pulses, according to the invention.

FIG. 9 is a flow chart showing a first method. Reference is made to FIGS. 7(A), 7(B), 7(C) and 10 which are tables for [7A]-stitches, [7B]-X pulse stitch, and [7C]-Y pulse stitch in memory. First, data of the X-axis and the Y-axis are beforehand known by the main routine prior to passing through the flow chart. If a PITCH 1, where a pitch is a stitch length, is called at the main routine, execution of PITCH 1 processing in FIG. 9 starts (S170). First, it is judged whether or not data of the X-axis and the Y-axis are the same amounts of movement (S171). If the amounts of movement of the data of the X-axis and the Y-axis are the same as each other, pulse spacing data are set in moving tables illustrated in FIG. 7(B) and FIG. 7(C) so as to be outputted at spacing of t (S176).

On the other hand, in case where the amounts of movement of the drive mechanism along the X-axis and the Y-axis are not the same as each other, it is judged whether or not the amount of movement of the drive mechanism along the X-axis is larger than that along the Y-axis (S172). In the case where the amount of movement of the drive mechanism along the X-axis is larger than that of the Y-axis, the pulse spacing data are set to ka of the moving table illustrated in FIG. 7(C). In this way the axis in which the amount of movement is larger, that is the X-axis, outputs the data at pulse spacing of t (S177). Subsequently, the following equation 1 is executed (S178).

$$\frac{x-1}{Y-1} = aY + b \quad (1)$$

By this computation, a (multiplier) and p (remainder) are computed, and the program proceeds to a next step. Subsequently, b that is the remainder is set to $1_b$ of the moving table illustrated in FIG. 10. The value ka, which outputs pulses at spacing of t×a, is set to a table illustrated in FIG. 7(C), and the remaining numeral Y−1−b is set $1_b$ illustrated in FIG. 10. The pulse separation data are set to a value in kb the table illustrated in FIG. 7(C) such that the pulses are outputted at spacing of t×(a+1) (S179). Here, the reason why the spacing of t×(a+1) is brought to only Y−1−b is that, since the first output pulse is outputted simultaneously for movement along the X-axis and the Y-axis regardless of the amounts of movement of the drive mechanism along the respective X-axis and Y-axis, one (1) is subtracted. Subsequently, the program is returned to the main routine (S180).

on the other hand, in case where it is judged at the step 172 that the amount of movement of the drive mechanism along the Y-axis is larger than that along the X-axis, the pulse separation data are set to the moving table illustrated in FIG. 7(C) such that the axis larger in amount of movement, that is the Y-axis, outputs the data at the pulse spacing of t (S173). Subsequently, the following equation 2 is executed (S174).

$$\frac{Y-1}{X-1} = cX + d \quad (2)$$

By this computation, c (multiplier) and d (remainder) are computed, and the program proceeds to a subsequent step. The remainder d is set to La of the moving table illustrated in FIG. 10, and the spacing of t×c is set to ka illustrated in FIG. 7(B). The pulse spacing data are set (S175) such that the remaining numeral X−1−d outputs the pulses at the spacing t×(c+1) to kb of the table indicated by Lb illustrated in FIG. 10. Here, the reason why the spacing is brought to the spacing of t×(c+1) only through X−1−d is that only one is subtracted in order that the first output pulse is outputted simultaneously for movement along the X-axis and the Y-axis, regardless of the amounts of movement of the drive mechanism along the X-axis and the Y-axis. Subsequently, the program is returned to the main routine (S180).

Further, at the main routine, a number of interruptions illustrated in FIG. 4 is computed, the X-axis is compared with the table (refer to FIGS. 7(B) and 7(C)) in which the pulse spacing data of the Y-axis are set, and the pulse for driving the stepping motor is outputted when the number of interruptions and the number of tables are brought to the same as each other.

Figure 11:
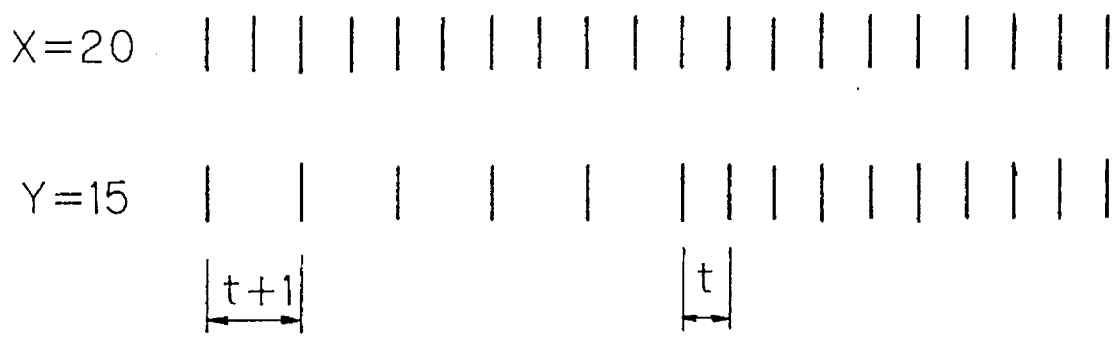
FIG. 11 is a view for explanation showing waveforms of pulse sending-out, according to the invention.

The pulses computed and outputted in the flow chart described above are illustrated in FIG. 11. FIG. 11 is an example in which twenty (20) pulses are outputted with respect to the X-axis, while fifteen (15) pulses are outputted with respect to the Y-axis. The example in FIG. 11 will be described on checking with FIG. 9. Then, since the number of pulses for movement along the X-axis is larger than the number of pulses for the Y-axis at the step 172 illustrated in FIG. 9, the program proceeds to the step 177. At the step 177, setting is made to each of the moving tables (refer to FIG. 8(B), FIG. 7(C) and FIG. 10) such that the spacing of the pulses for movement along the X-axis is brought to the spacing t.

Moreover, at the step 178, computation of a and b is executed. In this case, the computation is (20−1)/(15−1)= a×15+b, and the values of a and b are brought to a=1 and b=5. Subsequently, the step 179 is executed so that $1_a$=5 and ka t×(1+1) are set to the moving table. That is, the spacing of 2 ×t is set to the moving table. Also, for Y−1−b, $1_b$=15−1−5=9 pulses set the spacing of $K_b$=t×a=t×1=t to the moving table. Accordingly, as shown in FIG. 11, the amount of movement is brought to a uniform amount of movement in which the front half is the spacing for the Y-axis is at t+1, while the latter half is at a spacing of t.

Second Method

Figure 12:
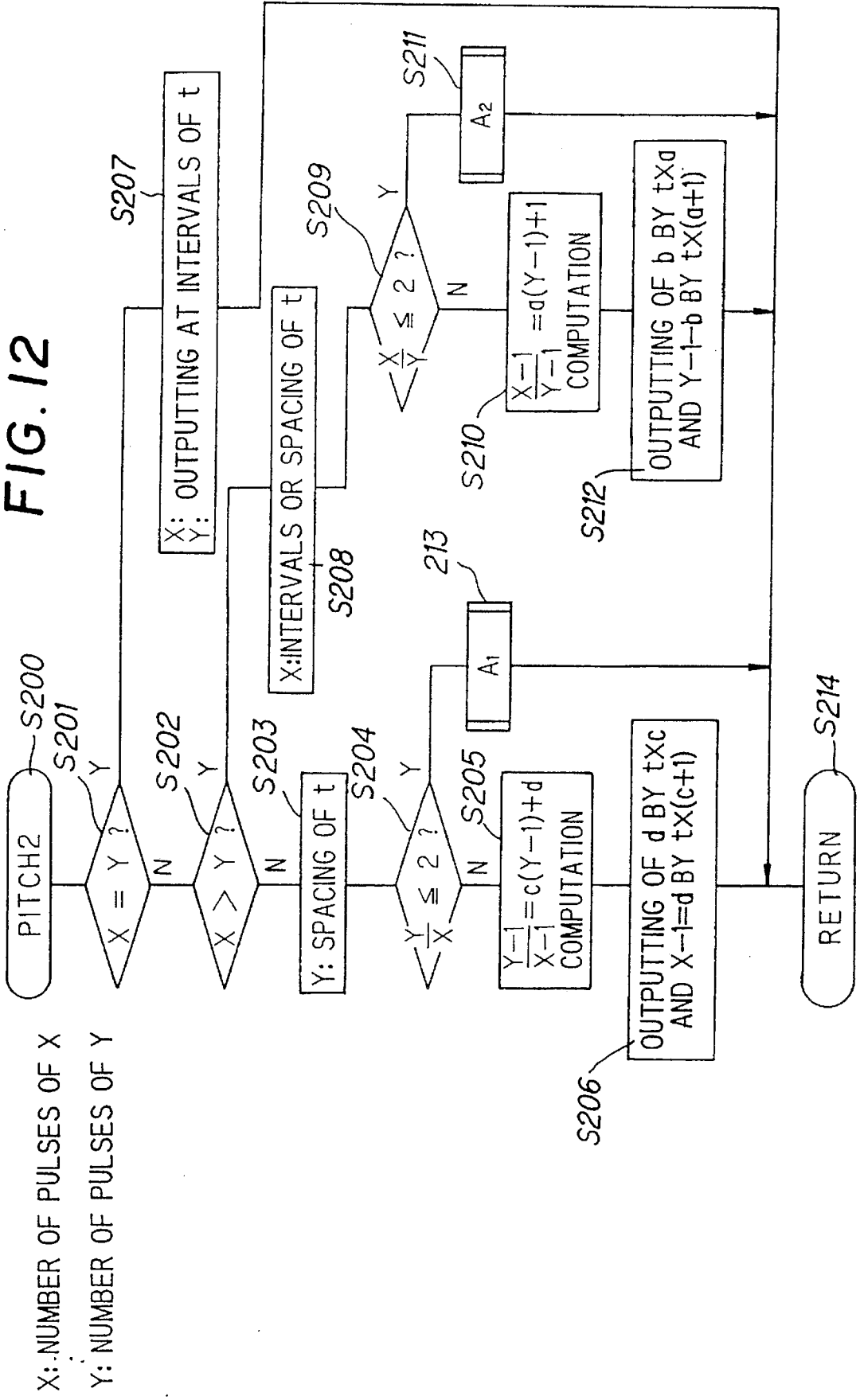
FIG. 12 is a flow chart showing operation determining a method of sending out the pulses, according to the invention.

FIG. 12 is a flow chart showing a second method. First, data of the X-axis and the Y-axis are beforehand known by the main routine prior to passing through this flow chart. If a PITCH 2 is called, processing equal to or below or following PITCH 2 illustrated in FIG. 12 is executed (S200). First, it is judged whether or not data of the X-axis and the Y-axis are the same in amount of movement as each other (S201). Here, if it is judged that the amounts of movement of the data of the X-axis and the Y-axis are the same as each other, pulse spacing data are set in the moving table illustrated in FIG. 7(B), FIG. 7(C) and FIG. 10 so as to be outputted at a spacing of t by the X-axis and the Y-axis.

On the other hand, in case where it is judged that the amount of movement of the drive mechanism along the X-axis and the Y-axis are not the same as each other, judgment regarding the magnitude of the amounts of movement of the drive mechanism along the X-axis and the Y-axis is executed (S202). In the case where the amount of movement of the drive mechanism along the X-axis is larger than that along the Y-axis, the pulse spacing data are set to the moving table illustrated in FIG. 7(B) and FIG. 10 such that an axis in which the amount of movement of the drive mechanism is larger, that is the X-axis, outputs data at pulse spacing of t (S208). Subsequently, the following equation 3 is executed (S209).

$$\frac{X}{Y} = \leq 2 \tag{3}$$

Figure 13A:
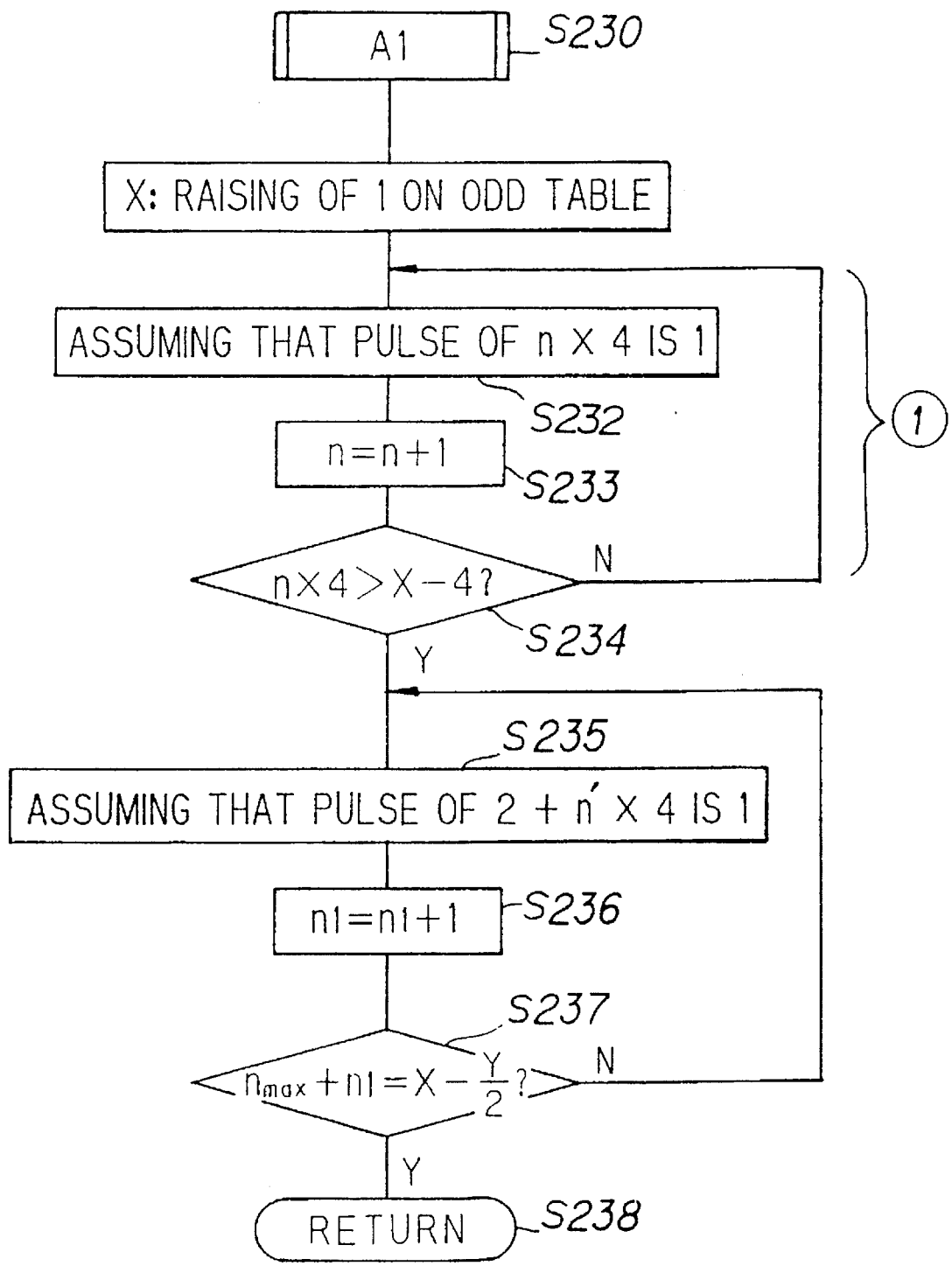
FIGS. 13(A) and 13(B) are flow charts of a subroutine showing operation which determines a method of sending out the pulses, according to the invention.
Figure 13B:
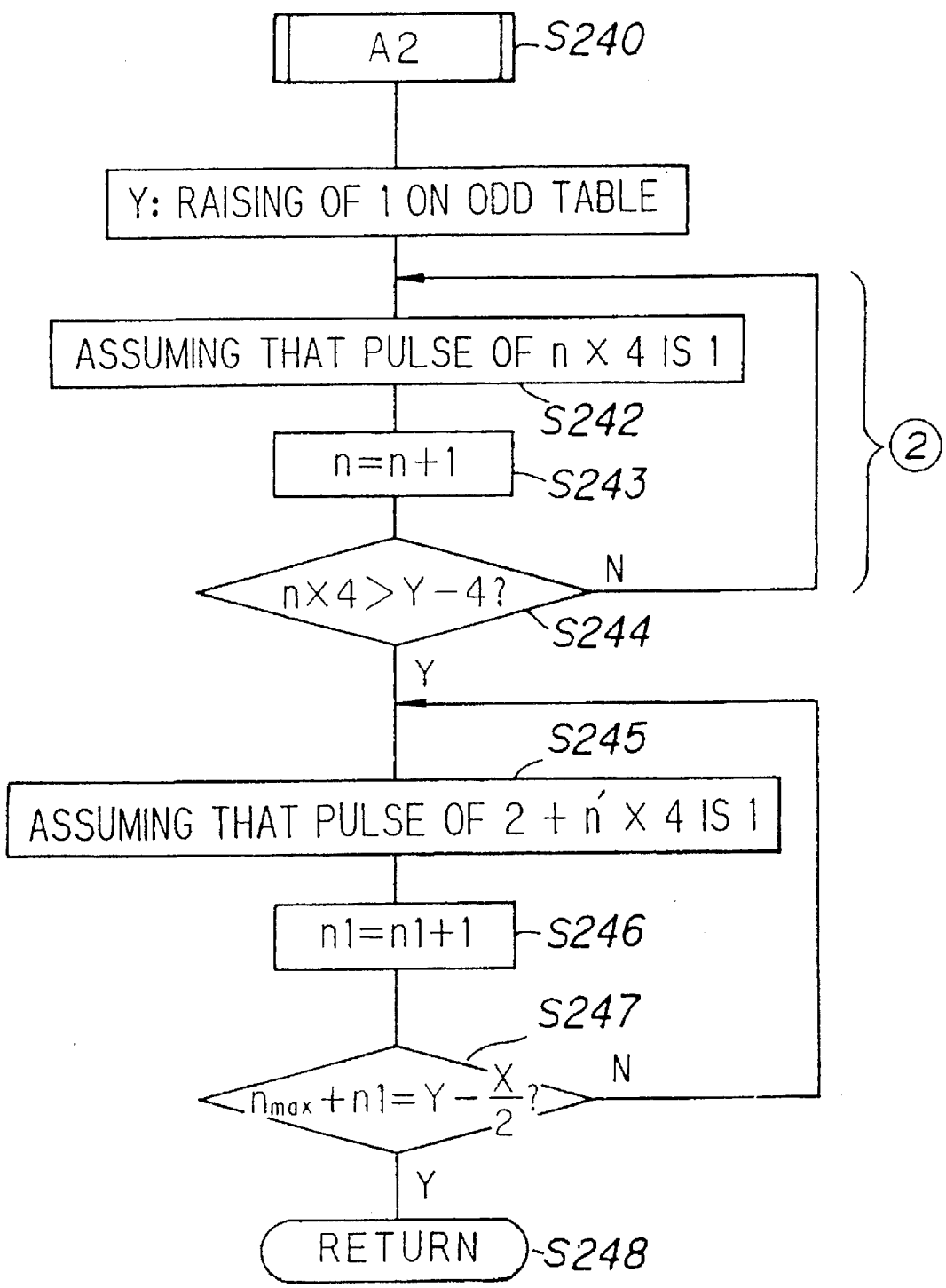

By this computation, if the above equation (3) is satisfied, a flow chart shown in FIG. 13(B) that is a subroutine is executed (S211). If the subroutine that is A2 is called at the step 211, processing moves to step 240 in FIG. 13(B), and operation subsequent to a step 241 is executed.

FIGS. 14(A) and 14(B) show tables for driving motor X, Y. As shown in FIG. 14(B), 1 is raised on the odd tables (S241). In this case, it is assumed that $k_a, k_b, \ldots$ expressing the spacing is brought to 1 as shown in FIG. 14(B). Here, 1 means that, in a main routine, pulses are sent out when this table is treated or processed. Conversely, 0 means that the pulses are not sent out. Subsequently, the table at n ×4 is changed or altered from 0 to 1 (S242). Here, n is a constant, and is surely set to 1 when the program enters this routine. Subsequently, n+1 is entered into n (S243). Subsequently, judgment as to whether or not the following equation (4) is applied is executed (S244):

$$n \times 4 > Y - 4 \tag{4}$$

When a value of n×4 becomes larger than a solution in which 4 is subtracted from the pulse of Y, the program is returned to the beginning of the table. The judgment is the judgment which is provided for altering the value of the table of $Y_2, Y_6, \ldots$ from 0 to 1. at the step 244, if the above equation 4 is not satisfied, the program is again returned to the step 242. In this connection here, since n has already been brought to 2, of the tables illustrated in FIG. 14(B), the table of $Y_3$ is altered to 1. Subsequently, similar treatment or processing is executed as to how many times. If the above equation (4) is satisfied at the step 244, the program proceeds to a step 245. Before the step 245 is entered, n is cleared to 0. Accordingly, 1 is raised on the table of $Y_2$ illustrated in FIG. 14(B) (S245). n1+1 is entered into n1 (S246). Subsequently, the following equation (5) is raised (S247):

$$n_{max} n_1 = Y - \frac{X}{2} \tag{5}$$

Here, what is $n_{max}$ is a value of n brought to the maximum at the step 243. Specifically, by the processing portion ② in FIG. 13(B), $n_{max}$ is a numeral in which the table is changed from 0 to 1. Time a numeral in which n1 is added to this numeral and Y−X/2 are brought to the same as each other means that the number of pulses of Y is brought to the mount of movement. Here, if the numeral and Y−X/2 are not the same as each other, the program is returned to the step 245. The same or identical processing is again execute on the assumption that n1 is 1 so that the table of $Y_6$ illustrated in FIG. 14(B) is changed to 1. This processing is executed until the above equation (5) is satisfied.

Further, if the above equation (5) is satisfied, the program escapes the subroutine at the step 211 illustrated in FIG. 12 (S248), and is returned to a main routine (S214). When, at the step 209, the above equation (3) is not satisfied, processing the same as that illustrated in FIG. 9 is executed at steps 210 and 212 (the steps 210 and 212 are the same in processing as the steps 178 and 179 illustrated in FIG. 9, and the description thereof will be omitted here), and the program is returned to the main routine (S214).

Furthermore, in the case where, at the step 202 illustrated in FIG. 12, the pulse spacing data are set to the moving table illustrated in FIG. 7(C) and FIG. 10 such that the amount of movement of the drive mechanism along the Y-axis is larger than that along the X-axis, the axis in which the amount of movement of the drive mechanism is large, that is, the Y-axis has the data output at the pulse spacing of t (S203). Subsequently, the following equation (6) is executed (S204).

$$\frac{Y}{X} \leq 2 \tag{6}$$

By this computation, if the above equation (6) is satisfied, the flow chart that is the subroutine illustrated in FIG. 13(A) is executed (S213). If the subroutine A1 is in the step 213 illustrated in FIG. 12, A1 shown in FIG. 13(A) is called so that steps subsequent to the step 231 are executed (S230). First, as shown in FIG. 14(A), 1 is raised on the odd tables (S231). Here, "1" means that pulses are sent out when this processing is executed in the main routine. Reversely, "0" means that pulses are not sent out. Specifically, a case where 1, 0, 1 is raised on the table in that specific order means that the pulses are sent out at a spacing of t×2. Subsequently, the table at n×4th position is altered from 0 to 1 (S232). Here, n is a constant, and is always set to 1 prior to entering into this routine. Subsequently, n+1 is entered into n (S233), and judgment as to whether or not the following equation (7) is satisfied is executed (S234):

$$n \times 4 > X - 4 \tag{7}$$

As a result of this judgment, when a value of n×4 becomes larger than an answer in which 4 is subtracted from the X pulses, the program is returned to the beginning of the table, and the value of the table of $X_2, X_6, \ldots$ is altered from 0 to 1. At a step 234, if the above equation (7) is not satisfied, the program is again transferred to the step 232. In this connection, since n has already been brought to 2, the table of $X_8$ in the tables illustrated in FIG. 14(A) is altered to 1. Subsequently, the similar processing is executed. If the above equation (7) is satisfied at the step 234, 1 is raised on the table location of $X_2$ illustrated in FIG. 14(A) (S235). Prior to entering into the step 235, n1 is cleared to 0. n1+1 is entered into n1 (S236), and the following equation 8 is executed (S237):

$$n_{max} + n_1 = X - \frac{Y}{2} \tag{8}$$

Here, $n_{max}$ is a value of n which is maximized at the step 233. Specifically, $n_{max}$ is a numeral in which the table is changed from 0 to 1 by a portion of ① in FIG. 13(A). This means that, in case where an answer in which the present n1 is added to the aforesaid numeral, and X−Y/2 are brought to the same as each other, the number of pulses of X is brought to the amount of movement. Here, if the answer in which the present n1 is added to the aforesaid numeral, and X −Y/2 are not brought to the same as each other, the program is returned to the step 235 where the same processing is executed on the assumption that n1 is 1. The table position of $X_6$ illustrated in FIG. 14(A) is changed to 1. This processing is repeatedly executed until the above equation (8) is satisfied.

If the above equation (8) is satisfied, the program escapes from the subroutine of the step 213 illustrated in FIG. 12 (S238), and is returned to the main routine (S214). When the above equation (6) is not satisfied at the step 204, processing the same as that illustrated in FIG. 9 is executed at steps 205 and 206, and the program is returned to the main routine (the step 205 and 206 are the same in processing as the steps 174 and 175 illustrated in FIG. 9, and the description thereof will be omitted).

sending-out of the pulses when the program is executed by the flow chart illustrated in FIG. 12 is shown in FIG. 15. Sending-out of the pulses is such that the amount of movement of the drive mechanism along the X-axis is a case of twenty (20) pulses, while the amount of movement of the drive mechanism along the Y-axis is a case of fifteen (15) pulses.

④ Method in which point of inflection is beforehand found or searched to eliminate td Next, a method in which processing is not executed one stitch by one stitch at feed, but a point of inflection is beforehand found to eliminate td in FIG. 5 will be described.

Figure 16:
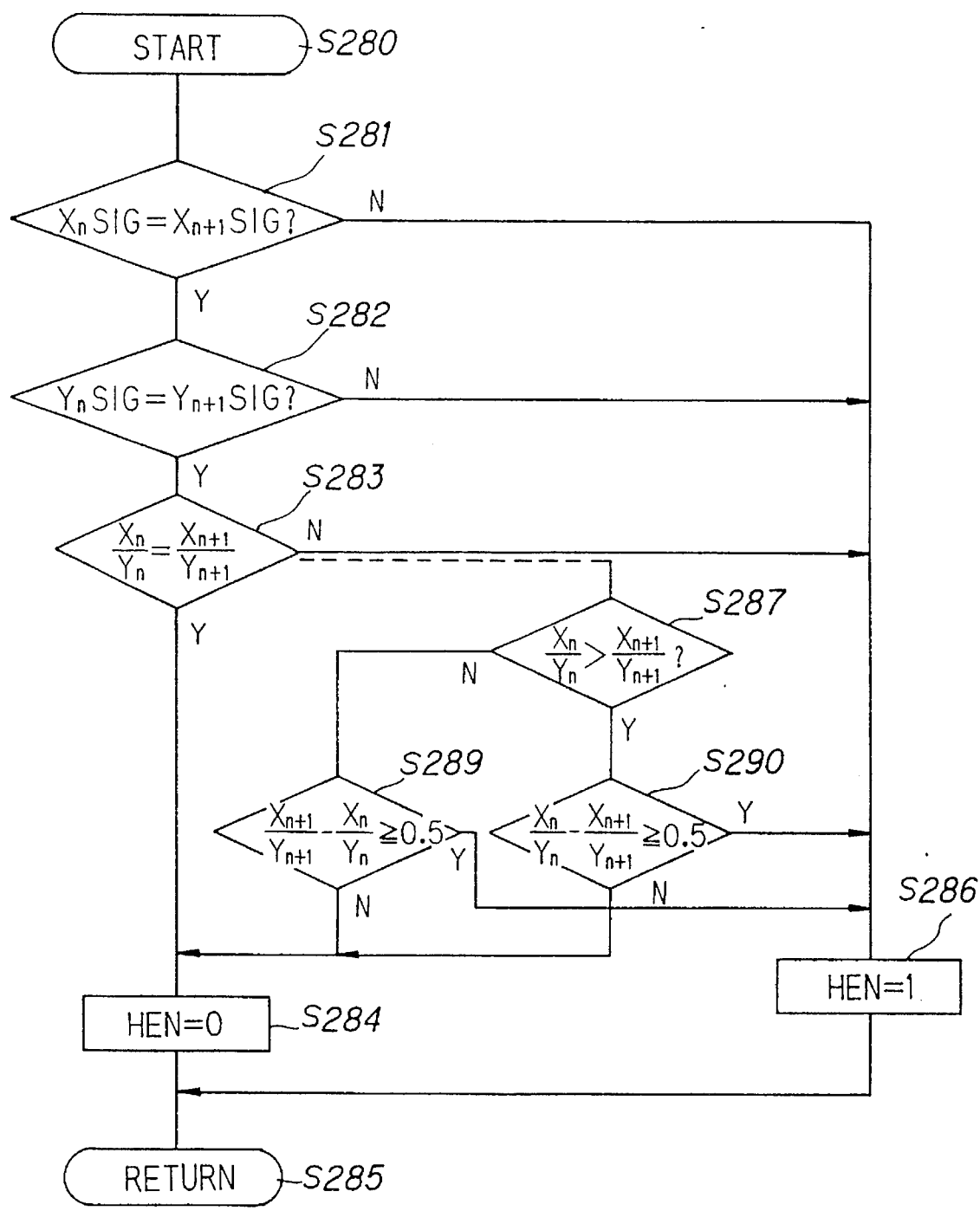
FIG. 16 is a flow chart showing operation which determines a method of sending out the pulses, according to the invention.

FIG. 16 is a flow chart for the purpose that a point of inflection is computed and is found. When a routine for computation of the point of inflection is called from the main routine, processing illustrated in FIG. 16 is executed (S280). First, a moving direction of X is judged (S281). Here, what are $X_n$ SIG and $X_{n+1}$ SIG mean moving directions at nth stitch and n+1th stitch of the X-axis. If the moving direction of the drive mechanism along the X-axis are different from each other at the nth stitch and n+1th stitch, 1 is raised on HEN which is a flag at the point of inflection (S286), and the program is returned to a main routine (S285).

Various processings at the point of inflection are executed by this HEN graph. If $X_n$ SIG and $X_n+1$ SIG are the same as each other at the step 281, judgment is executed regarding the moving directions of the drive mechanism along the Y-axis at nth stitch and n+1th stitch (S282). If the moving directions of the drive mechanism along the Y-axis at nth stitch and n+1th stitch are different from each other, 1 is raised on the flag HEN at the point of inflection (S286), and the program is returned to the main routine (S285). On the other hand, in case where the moving directions of the drive mechanism along the Y-axis are the same as each other at nth stitch and n+1th stitch, it is judged whether or not a ratio between the amount of moving of the drive mechanism along the X-axis and the amount of moving of the drive mechanism along the Y-axis at nth stitch and n+1th stitch are the same as each other (S283). In case where the ratios of the amounts of movement of the drive mechanism along the respective X-axis and Y-axis are not the same as each other at the step 283, 1 is raised on the flag HEN at the point of inflection (S286), and the program is returned to the main routine (S285). On the other hand, in case where the ratios are the same as each other, 0 is entered into the flag at the point of inflection (S284), and the program is returned to the main routine (S285).

Figure 17:
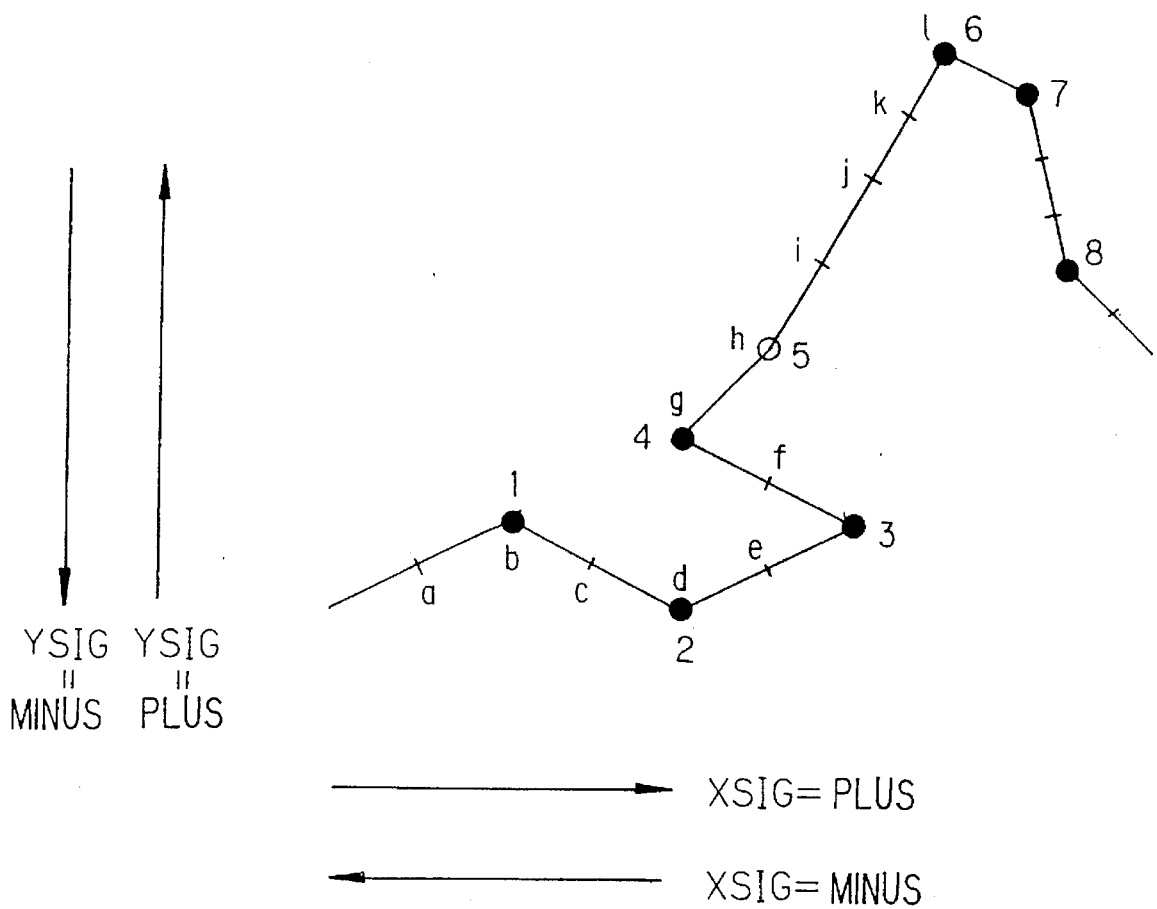
FIG. 17 is a view for explanation showing a point of inflection according to the invention.

The point of inflection in inflection-point computation due to processing, except for steps 287, 289 and 290 in FIG. 16, is illustrated in FIG. 17. In FIG. 17, a white circle and black circles indicate points which are judged to be a point of inflection. Specifically, since points 1, 2 and 6 are different in moving direction of the drive mechanism along the Y-axis from each other, these points are points judged to be a point of inflection at the step 282 illustrated in FIG. 16, while points 3 and 4 in FIG. 17 are different in moving direction of the drive mechanism along the X-axis from each other, these points are points judged to be a point of inflection in the step 281. Further, since points 5, 7 and 8 different in moving ratio between the drive mechanism along the X-axis and Y-axis from each other, these points are points judge to be a point of inflection at the step 283 in FIG. 16.

Next, the steps 287, 289 and 290 in FIG. 16 will be described. In case where the ratios between the amounts of movement of the drive mechanism along the respective X-axis and Y-axis are different from each other at the step 283, the program proceeds to the step 286 in the above description. Here, however, a routine proceeding to the step 287 is added. Specifically, the program proceeds from the step 283 to the step 287 by the broken line in FIG. 16. Here, it is judged which is larger between the ratio of nth stitch and the ratio of n+1th stitch (S287). If the ratio of nth stitch is larger than the ratio of n+1th stitch, the program proceeds to the step 290 where following equation (9) is executed (S290).

$$\frac{X_n}{Y_n} - \frac{X_n + 1}{Y_n + 1} \geq 0.5 \qquad (9)$$

If an amount of variation of the ratio between nth stitch and the ratio of n+1th stitch is larger than 0.5 at the step 290, 1 is entered into the inflection-point flag HEN (S286), and the program is returned to the main routine (S285). On the other hand, if a difference between the amount of variation at n+1th stitch and the amount of variation at n+1th stitch is less than 0.5 at the step 290, 0 is entered into HEN (S284), and the program is returned to the main routine (S285). On the other hand, the ratio at the n+1th stitch is larger than that at the nth stitch at the step 287, the ratio at the nth stitch is subtracted from the ratio at the n+1th stitch, and it is judged whether or not the amount of variation of the ratio is larger than 0.5 (S289). If the amount of variation of the ratio is larger than 0.5, 1 is entered into the inflection-point flag HEN (S286), and the program is returned to the main routine (S285). On the other hand, a difference of the amount of variation between nth stitch and n+1th stitch is less than 0.5, 0 is entered into HEN (S284), and the program is returned to the main routine (S285).

Here, the steps 287, 289 and 290 are such that the ratios between nth stitch and n+1th stitch are compared with each other and, thereafter, if circumstances require, the step 289 and the step 290 are executed. However, computation may be executed by the following equation to execute judgment:

$$\left| \frac{X_n}{Y_n} - \frac{X_n + 1}{Y_n + 1} \right| \geq 0.5 \qquad (10)$$

As described above, if in FIG. 17 the point of inflection in the processing into which the steps 287, 289 and 290 in FIG. 16 are inserted, the point of inflection becomes black circles. In FIG. 17, a, b . . . mean the position of one stitch. Here, the point 5 is first considered. It is assumed that a location between g and h is 10 of the amount of movement of the drive mechanism along the X-axis, and 10 of the amount of movement of the drive mechanism along the Y-axis. Furthermore, it is assumed that a subsequent one stitch, that is, a location between h and j is 6 of the amount of movement of the drive mechanism along the X-axis, and 10 of the amount of movement of the drive mechanism along the Y-axis. If this is applied to the steps 287, 289 and 290 in FIG. 16, there is produced the relationship of 10/10>6/10, and the program proceeds to the step 290. At the step 290, the relationship is brought to 1−0.6<0.5. The program proceeds to the step 284 where this does not become the point of inflection. Specifically, the point 5 is generally called "point of inflection". However, it is judged that the point 5 is not the point of inflection, at the steps 287, 289 and 290.

Figure 18:
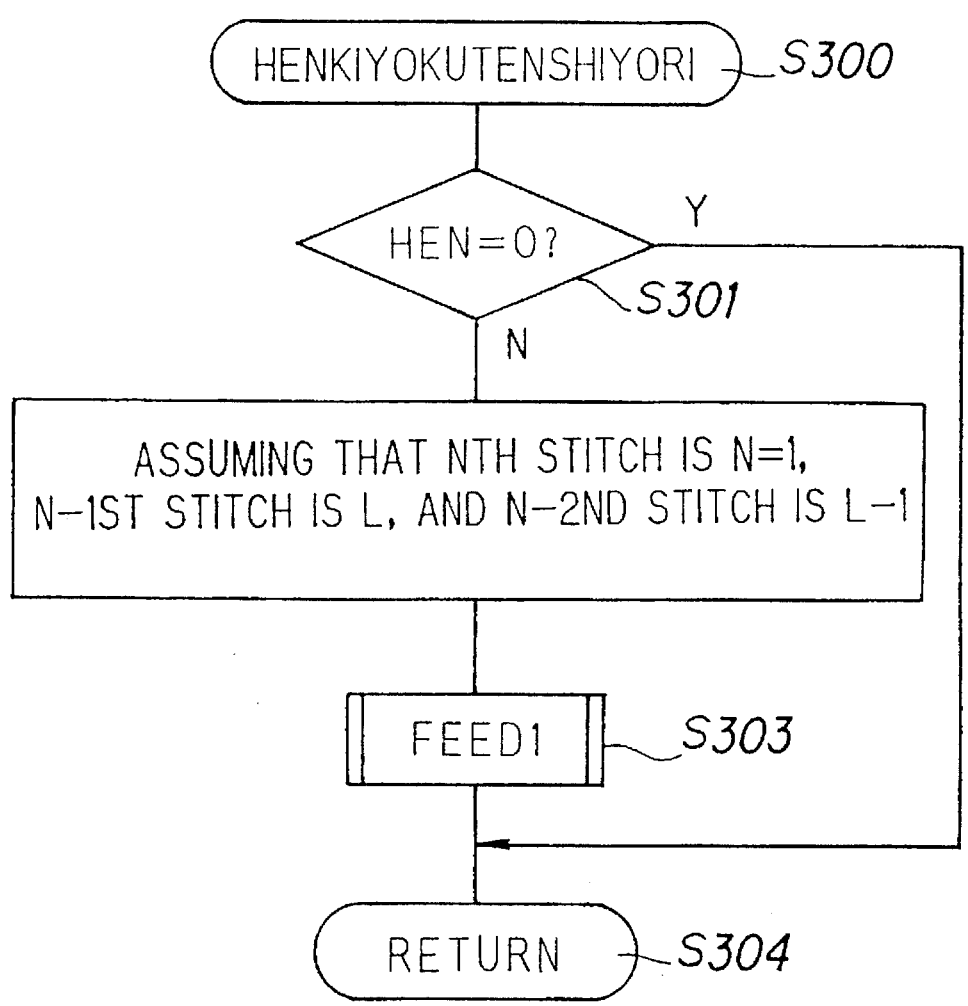
FIG. 18 is a flow chart showing processing at the point of inflection according to the invention.

Next, a portion of the processing at the point of inflection will be described. The point of inflection is a location where the moving direction of the drive mechanism along the X-axis, the moving direction of the drive mechanism along the Y-axis and the amount of movement vary. Driving due to the motor is generally executed at that point. There is a possibility that the two-axis drive mechanism is vibrated or oscillated, and is stepped out in the worst case. In order to avoid this, a flow chart illustrated in FIG. 18 is executed. In case where the main routine processes the point of inflection, the main routine first calls "HENKIYOKUTENSHIYORI" which means control of the inflection point, and executes the same (S300). First, it is judged whether or not the inflection-point flag HEN is 0 (S301). In case where the inflection-point flag HEN is 0, the program escapes this routine, and is returned to the main routine (S304).

In case where it is judged as being the point of inflection at the step 301, Nth stitch that is the point of inflection is brought to the first one stitch, N=1 is entered, N−1th stitch is brought to L, and N −2th stitch is brought to L−1 (S302). Subsequently, the processing illustrated in FIG. 6 and already described is executed, whereby the speed of the feed is reduced in front of and behind the point of inflection (S303), and the program is returned to the main routine (S304). As described above, if the point of inflection is considered, whereby it is not required to execute computation between one stitch and on stitch, td is not required, and it is possible to reduce the speed of the feed at the location in front of and behind the point of inflection.

⑤ Specific drive method at the time uniform drive command is given

Figure 19:
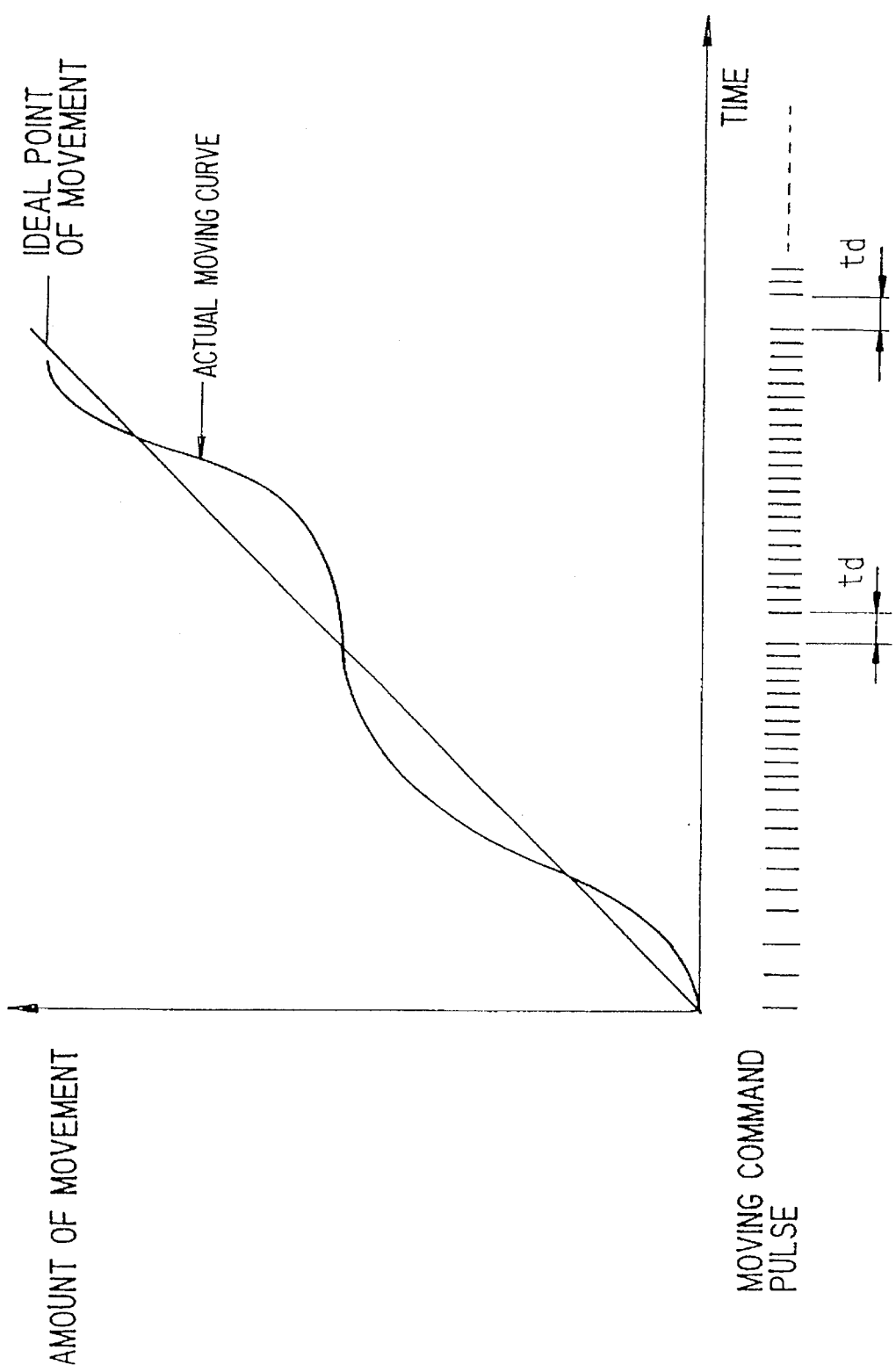
FIG. 19 is a view for explanation showing pulses and moving waveforms of a two-axis drive mechanism in processing every one stitch, according to the invention.

A specific or special drive method at the time a uniform drive command is given to the two-axis drive mechanism will be described. As has already been described with reference to FIG. 34 in the conventional example, even if the drive command is uniformly outputted, oscillation occurs in the two-axis drive mechanism. Further, in case where inflection-point processing is not used, the computation time td exerts a bad influence as illustrated in FIG. 19, so that there may be case where actual movement is brought to a configuration containing much oscillation. In order to avoid this, a moving-command pulse output method, illustrated in FIG. 20, is executed. The output method will hereunder be described.

The point of inflection is determined by the processing illustrated in FIG. 16 and, subsequently, the moving table of the two-axis drive mechanism is generally brought to one like one illustrated in FIG. 21(A). Here, spacing among $X_1$, ... $X_5$ is an example, to the last, and it is needless to say that the spacing takes any numerals. Furthermore, the numbers within the table of $X_1$, $X_2$ ... $X_5$ may likewise take any numerals.

Figure 34:
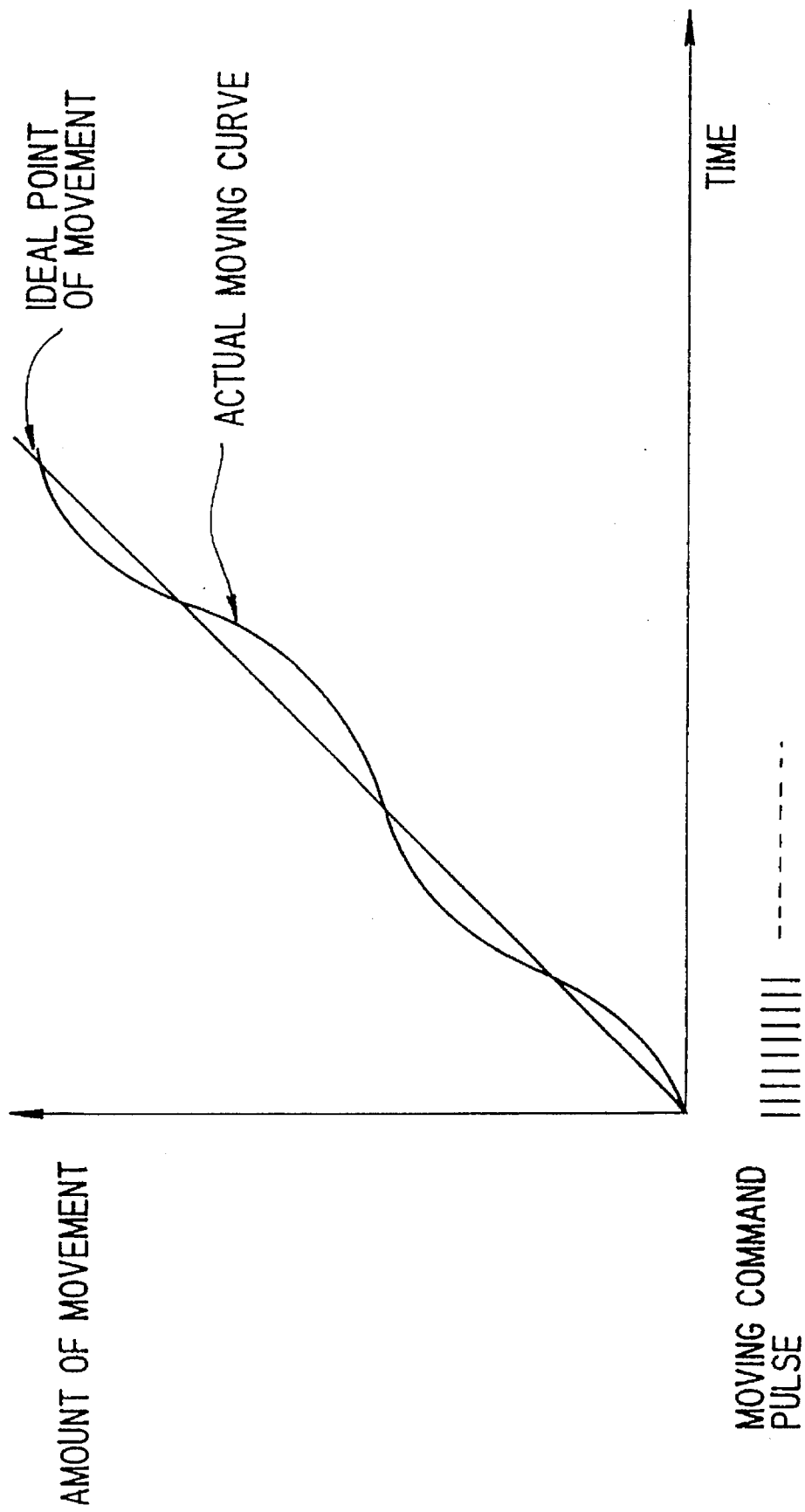
FIG. 34 is a view showing moving waveforms and pulses of a conventional two-axis drive mechanism.

Here, it is assumed that the pulses for driving the two-axis drive mechanism at the maximum speed t×2 are thirty-five (35) pulses as illustrated in FIG. 21(A). If these pulses are outputted uniformly, an actual moving curve does not approach an ideal curve as illustrated in FIG. 34. Next, as shown in FIG. 21(B), in case where fourteen (14) H pulse separations or spacings are inserted, that is, t×4 is inserted at intervals of 20 during a time in which the pulse separation is the maximum speed t×2 as illustrated in FIG. 21(B), the actual moving curve approaches the ideal curve as shown in FIG. 20.

Figure 22:
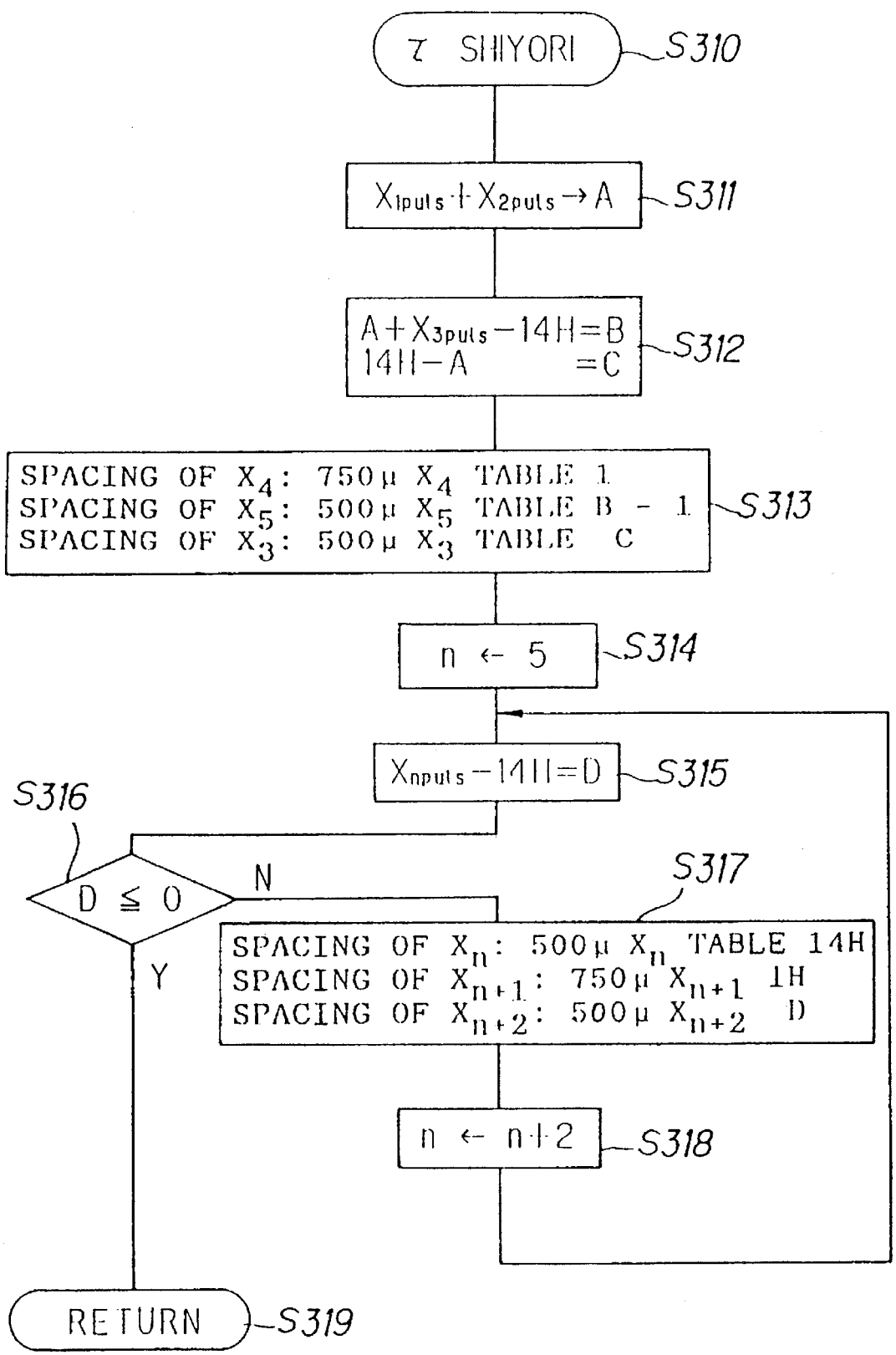
FIG. 22 is a flow chart showing operation which determines a method of sending out pulses, according to the invention.

In order to realize the moving table of the two-axis drive mechanism, processing of a flow chart illustrated in FIG. 22 is executed. When "τ SHIYORI" is called at the main routine, the following processing, which means control of τ, is executed (S310). This flow chart is described regarding only the X-axis, in order to simplify the description. What are $X_{1puls}$ and $X_{2puls}$ are the number of pulses within the table of $x_1$ and $x_2$ illustrated in FIG. 21(A), and are described by sexadecimal or hexadecimal.

First, the number of pulses $x_1$ and the number of pulses $x_2$ are substituted into A (S311). subsequently, the number of pulses A and the number of pulses $x_3$ are added to each other, and the number of pulses into which time of τ is desired to be inserted (which is 14H in this flow chart) is subtracted. It is assumed that this value is B. Further, a value in which a value of A is subtracted from 14H is brought to C (S312). Furthermore, alteration of the table due to insertion of τ is executed (S313). Specifically, the processing of the step 313 is executed whereby tables of $X_1$, $X_2$, $X_3$, and $X_4$ are prepared as illustrated in FIG. 21(B).

Next, 5 is substituted into n (S314), τ is subtracted from the number of pulses $X_5$ desired to be inserted, and the subtraction value is entered into D (S315). Further, it is judged whether or not the value of D is positive and negative (S316). If the value of D is not positive, the program escapes from this routine, and is returned to a main routine (S319). On the other hand, at the step 316, in case of positive, tables of $x_5$, $x_6$ and $X_5$ and $X_6$ illustrated in FIG. 21(B) are prepared. A value of n+2 is entered into n (S318), and the program is returned to the step 315. This processing is executed until D≦0.

An example of the waveform due to the table illustrated in FIG. 21(B) prepared due to the flow chart illustrated in FIG. 22 as described above is shown in FIG. 20. A difference between FIG. 20 and FIG. 19 is such that a computation time that is td is required every one stitch, whereby a delay in sending-out of the pulses occurs. When the length of one stitch is altered, locations into which td is entered are different from each other. On the contrary, it is possible that t illustrated in FIG. 20 is arranged leaving a predetermined number of pulses. Furthermore, in case of FIG. 20, it is also possible to insert two pulses with the spacing of τ subsequent to the predetermined number of pulses. Moreover, it is needless to say that it is possible to insert pulses whose spacings are t+1, t+2, t+3, t+2 and t+1 subsequent to the predetermined number of pulses.

Next, a case where a heavy load is loaded onto the two-axis drive mechanism will be described with reference to FIG. 1. A point 68 which is brought to a 1-level by a pull-up resistor 92, when a weight loading switch 91 is turned on, is brought to a 0-level. Thus, the I/O 35 outputs that the weight loading switch 91 is turned on, through the peripheral data buffer. The CPU 27 receives this signal, and alters the moving table at the actual sewing (not feed). In other words, the operating mode is switched to table movement of the recognition that the load to the XY table will largely change (weight switch SW on), so that the XY table will not go off from the rated operation even if the load to the XY table becomes large. Further, the CPU 27 does not change the pulses within the table of the feed illustrated in FIG. 21(B), but slows time of sending-out of the pulses of $X_1$, $X_2$ .... Specifically, the pulse spacing is brought to a pulse spacing twice that illustrated in FIG. 21(B) as shown in FIG. 21(C). Moreover, in order to realize this by another method, means for altering interrupt time described with reference to FIG. 4 can also be used.

Further, description has been made such that all the speed is doubled in order to simplify the description. It is needless to say, however, that the maximum speed, that is, only $X_3$ and $X_5$ in FIG. 21(B) are doubled. Furthermore, although the speed has been described as being doubled, it is needless to say that a tripled speed is realizable. It is needless to say that the speed may be slowed optionally.

⑥ Method of controlling motor used for driving two-drive mechanism

Next, a method of controlling a motor which is used for driving the two-axis drive mechanism will be described. As has been described as the conventional example with reference to FIG. 29, FIG. 30(A), FIG. 30(B), FIG. 30(C) and FIG. 30(D), the stepping motor angularly moves 1.8° per one step in case of two-axis excitation, and angularly moves 0.9° per one step in case of two-phase excitation. Further, the case of 1–2 phase excitation, torque fluctuation of $\sqrt{2}$ times at $I_1$ and $I_2$ occurs as illustrated in FIG. 30(D). That this torque fluctuation is reduced and, further, angular movement of 0.45° per one step is realized is a circuit illustrated in FIGS. 2 and 3. Furthermore, FIG. 23 is a theoretical view thereof.

Figure 23:
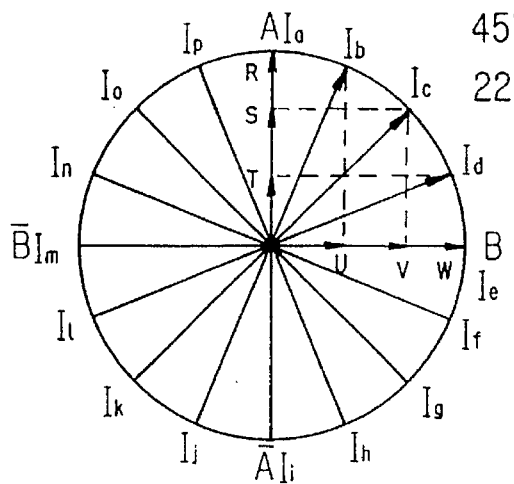
FIG. 23 is a view for explanation showing a theory of driving of a stepping motor, according to the invention.

FIG. 23 is a theoretical view which corresponds to a drive signal (corresponding to the signal in FIG. 2) of an X-axis 4 stepping motor. It shows how the current flowing through the stepping motor causes 0.45° per one step to be realized so that the torque is uniformized. FIG. 23 will hereunder be described with FIG. 2 used. FIG. 2 describes only the circuit of A-phase of the X-axis step. Since, however, a B-phase circuit is the same as the A-phase circuit, a figure thereof will be omitted. At a stage 1, XAP is brought to active one. That is, the XAP signal 73 in FIG. 2 is brought to active one. The transistor 84 is turned on by the base drive circuit 78. Furthermore, the transistor 81 is turned on through the comparator and the base drive circuit 73.

Thus, the current of the A-phase flows in a direction indicated by the one-dot-and-chain line 86. Moreover, this current is converted to voltage by the shunt resistor 80, and is inputted to the error amplifier 79. On the other hand, since the XAPU signal 105, the XASEN 1 signal and the XASEN 2 signal are inactive ones, the voltage at the point B is determined by the resistor 114 and the resistor 115. This difference therebetween is outputted to the point A, and is compared by the comparator 75. Thus, current R as illustrated in FIG. 23 flows.

Next, a stage 3 at which the current of A-phase varies or changes will be described. At the stage 3, the XAP signal 73 and the XASEN 1 signal are brought to active ones. Here, a difference between the former and the latter is that the XASEN signal 106 is brought to active one. Thus, the analog switch 109 is turned ON. When the analog switch 109 is turned ON, the resistor 112 is connected to an 0V line. Thus, the point of B is brought to voltage lower than that at the time of the stage 1, by a partial pressure or potential between the resistor 114 and the resistors 115 and 112. The voltage is brought to 1/$\sqrt{2}$ at the time the analog switch 109 is not turned ON, whereby it is possible to flow current that is S illustrated in FIG. 23. At this time, current V that is 1/$\sqrt{2}$ flows also through the B-phase, whereby it is possible to orient or direct the direction (not shown) toward a direction $I_0$.

Further, a stage 4 will be described. When, at the stage 4, the XAP signal 73 brings the active XASEN 2 signal 107 active, the analog switch 110 illustrated in FIG. 2 is turned ON. The resistor 113 is made effective. If the resistor 110 is determined such that the voltage at the point B is brought to a value of tan 22.5° by the potential of the resistor 114, the resistor 115 and the resistor 110, current that is T illustrated in FIG. 23 flows through the A-phase. On the other hand, the B-phase is brought to a direction that is $I_d$ by the fact that only the XBP signal is active one. As described above, the current in the phases of the stepping motor is controlled by the use of the analog stepping motor, whereby it is possible to segment or subdivide the rotational angle of the stepping motor.

⑦ Method of controlling exciting current flowing through stepping motor

Next, a method of controlling exciting current flowing through the stepping motor by driving speed of the stepping motor will be described. Generally, it has been known that a torque of the stepping motor decreases as the drive speed of the stepping motor increases. In order to avoid this, when the drive speed of the stepping motor increases, the current flowing through the stepping motor increases to prevent the torque from decreasing.

The XAPU signal 105 in FIG. 2 is a signal for this purpose. For example, when the table of $X_3$ in FIG. 21(B) is outputted, the XAPU signal 105 is brought to active one. Specifically, it is known, when the XAPU signal 105 is brought to active one in case where the stepping motor is driven at a high speed, the analog switch 108 is turned ON, and the voltage at the point B is brought to potential between the resistors 114 and 111 and the resistor 115, and is brought to pressure higher than that of a case of only the resistor 114. Since, when the high pressure at the point B is raised, the error amplifier 79 controls such that the voltage at the point B and the voltage at the point C are compared with each other and, finally, the voltage at the point C and the voltage at the point B are brought to the same voltage, a value of the current passing through the A-phase is brought to large one.

Further, as another embodiment, there is one illustrated in FIG. 3. This is a case where a D/A converter is used in substitution for the analog switch for increasing the current. An input of the D/A converter 121 is connected to a bus line 122 of the CPU so that voltage at a point F that is the output from the D/A converter 121 is capable of being controlled from the CPU. Further, although the connecting method of the analog switches 126 and 127 is different from that illustrated in FIG. 2, the amplification factor of the computation amplifier 128 is altered, and the voltage at the point C is changed, whereby there can be produced advantages similar or equivalent to those of the analog switches 109 and 110 illustrated in FIG. 2.

An adder in which the voltage at the point D and the voltage at the point F that is the output from the D/A converter 121 are added to each other is indicated by the reference numeral 117. A value added by the adder 117 is inputted to the error amplifier 79. Accordingly, it is assumed that, when the voltage at the point F that is the output from the D/A converter 121 is 3 V, for example, standard current flows. Here, when, for example, the table of $X_3$ in FIG. 21(B) is outputted, if the output voltage of the D/A converter 121 and the voltage at the point F is lowered or dropped to 2 V, the error amplifier 79 operates as if the A-phase current drops. Since the error amplifier 79 operates such that the point E and the point B are brought to the same voltage, the A-phase current increases. Accordingly, it is possible to increase the current by the speed at which the stepping motor is driven. Furthermore, although only means for increasing the current flowing through the stepping motor has been describe, the current may decrease reversely of conversely.

⑧ Method of altering driving method of stepping motor

Next, a method of altering the method of driving the stepping motor, by the drive speed of the stepping motor will be described. As illustrated in FIG. 23, in the control circuit capable of operating through 0.45° per one step, it is easy to realize 1–2 phase excitation and 2 phase excitation. Specifically, in order to realize the 1–2 phase excitation, only the odd stages should be commanded like 1, 3, 5 . . . in the same circuit. Further, in the case of 2 phase excitation, a stage should be command like 1, 5 in which the middle three are skipped over or jumped over. Specifically, the method of controlling the stepping motor is capable of being freely selected.

In outputting of the pulses, in case where interruption or the like is used, particularly, that interrupt time is shortened, that is, the spacing indicated by the arrow illustrated in FIG. 4 causes disadvantages that computation processing of the CPU is not in time, or the like. In this case, that is, in case where the stepping motor is driven at the high speed, the interrupt speed is reduced to ½, and the drive angle of the stepping motor increases twice correspondingly, whereby a load of the CPU is reduced, and it is possible to drive the CPU stably. This will be described with FIG. 23 used.

$I_a$, $I_b$ . . . p in FIG. 23 mean half-step driving. If this is altered to the 1–2 phase excitation, $I_a$, $I_b$ . . . $I_p$ are brought to $I_a$, $I_c$, $I_e$, $I_g$, $I_i$, $I_k$, $I_m$ and $I_o$. Further, in case of the 2 phase excitation, $I_a$, $I_b$ . . . $I_p$ are brought to $I_e$, $I_a$, $I_i$ and $I_m$. Here, it is assumed that the half-step driving is first executed. Subsequently, it is assumed that the stepping motor is rotated at a twice speed. In order to rotate the stepping motor at the twice speed, the excitation is altered to the 1–2 phase excitation, whereby the interrupt time should send out the pulses by the use of the same interrupt time.

Here, if it is desired that the stepping motor is rotated at a further twice speed, the rotation is possible if the interruption is the same interruption and the excitation method is brought to the 2 phase excitation. Specifically, it is possible to drive the stepping motor at a speed four times that at the time all is driven by the half-step driving with the same interrupt time. Furthermore, it is needless to say that, unlike the 1–2 phase excitation described in the conventional example, it is possible to produce a stable torque.

In the embodiment, the table is used to execute driving as illustrated in FIG. 21(A), FIG. 21(B) and FIG. 21(C). However, the arrangement may be such that a microcomputer having a high speed is used to eliminate generation of td, to execute the inflection-point processing.

Figure 24:
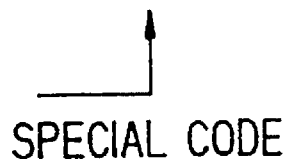
FIG. 24 is a view for explanation showing a table which expresses processing at the time special codes exist, according to the invention.
Figure 25:
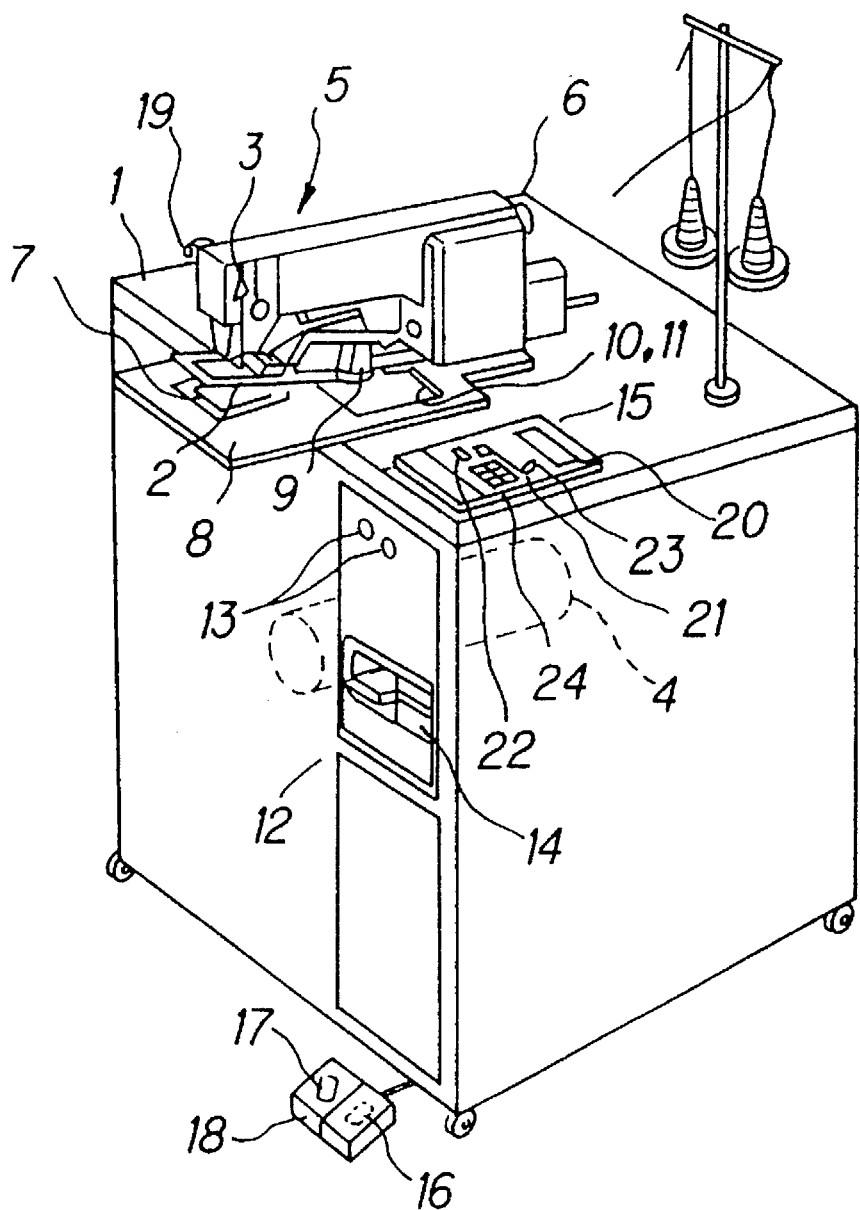
FIG. 25 is a perspective view showing an outer appearance of a general automatic sewing machine.

Moreover, as shown in FIG. 24, the arrangement may also be such that, taking into consideration a case where specific or special codes, for example, inverted codes or the like in the middle of the feed, it is possible to control the table by the provision of baits of special codes as illustrated in FIG. 24 as two-bite data.

Further, regarding means for altering the frequency of interruption, the input level of VCO may be altered in substitution for altering of a value of the CPU timer.

Furthermore, there is no problem if the minimum spacing t of pulse sending-out is the same as the cycle of the interruption. Moreover, t may be a number of interruptions.

Although the invention has been described with respect to various specific embodiments for a complete and clear disclosure, the appended claims are not to be thus limited but are to be construed as embodying all modifications and alternative constructions that may occur to one skilled in the art which fairly fall within the basic teaching herein set forth.

What is claimed is:

1. A control method for an automatic sewing machine having a drive motor for driving a spindle and a drive mechanism for moving a cloth retaining unit in a predetermined pattern to permit sewing of a plurality of stitches, said drive mechanism comprising at least a first stepping motor for providing movement in a first axis direction and a second stepping motor for providing movement in a second axis direction, and a variable speed interrupt timer for controlling the generation of drive command pulses for driving said drive mechanism at speeds equal to or less than a maximum speed, said pulses being generated by processing on a per-stitch basis, comprising:

identifying a present stitch in a predetermined sequence of a plurality of stitches;

generating for said present stitch at least one of first pulses which are drive commands to said first stepping motor and second pulses which are drive commands to said second stepping motor; and moving the drive mechanism, which is driven by the pulses generated in the generating step, at a speed slower than said maximum speed wherein the speed is determined by the relative position of the stitch identified in said identifying step.

2. The control method as set forth in claim 1 wherein the pulse period used for said at least first and second pulses comprises a multiple of a minimum pulse period.

3. An automatic sewing machine which has a sewing machine mechanism for controlling movement of a spindle and is operative to sew a predetermined pattern in a plurality of stitches, comprising:

cloth retaining means for clamping an article to be sewed;

a two-axis drive mechanism operative to move said cloth retaining means at least along a first axis and a second axis, independently;

processing means for processing commands for sewing in said predetermined pattern on a per-stitch basis and for generating at least first data and second data for controlling movement along said first axis and said second axis, respectively;

drive control means for drivingly controlling said two-axis drive mechanism to move said cloth retaining means to desired positions, said drive control means being operative in response to said first data and said second data to move said two-axis drive mechanism at a speed equal to or less than a maximum speed;

control means for controlling movement of said cloth retaining means along said first axis and said second axis, at a speed slower than said maximum speed at which said two-axis drive mechanism is moveable along said first axis and said second axis in accordance with said first data and said second data; and wherein movement of said cloth retaining means, for identified stitches which are at predetermined positions at movement start and identified stitches which are at predetermined positions before movement completion, is slower than said maximum speed.

4. The sewing machine as set forth in claim 3, wherein said identified stitches comprise at least a last single stitch and a stitch prior thereto.

5. An automatic sewing machine which has a sewing machine mechanism for controlling movement of a spindle and is operative to sew a predetermined pattern in a plurality of stitches, comprising:

cloth retaining means for clamping an article to be sewed;

a two-axis drive mechanism operative to move said cloth retaining means at least along a first axis and a second axis, independently;

processing means for processing commands for sewing in said predetermined pattern on a per-stitch basis and for generating at least first data and second data for controlling movement along said first axis and said second axis, respectively;

drive control means for drivingly controlling said two-axis drive mechanism to move said cloth retaining means to desired positions, said drive control means being operative in response to said first data and said second data to move said two-axis drive mechanism at a speed equal to or less than a maximum speed;

control means for controlling movement of said cloth retaining means along said first axis and said second axis, at a speed slower than said maximum speed at which said two-axis drive mechanism is moveable along said first axis and said second axis in accordance with said first data and said second data;

wherein, for movement along said first axis and said second axis, in case where there is movement along said first axis and said second axis simultaneously, said two-axis drive mechanism is controlled so that a speed along one of said first axis and said second axis along which an amount of movement of said two-axis axis drive mechanism is larger is the maximum speed, while a speed along one of said first axis and said second axis along which an amount of movement of said two-axis drive mechanism is smaller is slower than the maximum speed; and wherein said two-axis drive mechanism is controlled so that the amount of movement along said axis along which the amount of movement of said two-axis drive mechanism is larger and the amount of movement along said axis along which the amount of movement of said two-axis drive mechanism is smaller are uniform.

6. An automatic sewing machine which has a sewing machine mechanism for controlling movement of a spindle and is operative to sew a predetermined pattern in a plurality of stitches, comprising:

cloth retaining means for clamping an article to be sewed;

a two-axis drive mechanism operative to move said cloth retaining means at least along a first axis and a second axis, independently;

processing means for processing commands for sewing in said predetermined pattern on a per-stitch basis and for generating at least first data and second data for controlling movement along said first axis and said second axis, respectively;

drive control means for drivingly controlling said two-axis drive mechanism to move said cloth retaining means to desired positions, said drive control means being operative in response to said first data and said second data to move said two-axis drive mechanism at a speed equal to or less than a maximum speed;

control means for controlling movement of said cloth retaining means along said first axis and said second axis, at a speed slower than said maximum speed at which said two-axis drive mechanism is moveable along said first axis and said second axis in accordance with said first data and said second data;

wherein, for movement along said first axis and said second axis, in case where there is movement along said first axis and said second axis simultaneously, said two-axis drive mechanism is controlled so that a speed along one of said first axis and said second axis along which an amount of movement is larger is the maximum speed, while a speed along one of said first axis and said second axis along which an amount of movement is smaller is slower than the maximum speed; and wherein said two-axis drive mechanism is controlled so that the speed along the axis along which the amount of movement is smaller is based on a ratio of the amount of movement along said axis along which the amount of movement is larger to the amount of movement along said axis along which the amount of movement is smaller.

7. A control method for an automatic sewing machine having a drive motor for driving a spindle and a drive mechanism for moving a cloth retaining unit in a predetermined pattern to permit sewing of a plurality of stitches, said drive mechanism comprising at least a first stepping motor for providing movement in a first axis direction and a second stepping motor for providing movement in a second axis direction, and a variable speed interrupt timer for controlling the generation of drive command pulses for driving said drive mechanism at speeds equal to or less than a maximum speed, said pulses being generated by processing on a per-stitch basis, comprising:

identifying a present stitch in a predetermined sequence of a plurality of stitches;

generating for said present stitch at least one of first pulses which are drive commands to said first stepping motor and second pulses which are drive commands to said second stepping motor; and moving the drive mechanism, which is driven by said first pulses and said second pulses, along said first axis and said second axis simultaneously;

wherein the drive mechanism is controlled at the maximum speed along one of said first axis and said second axis along which the amount of movement of the drive mechanism is larger, and is controlled at a speed slower than the maximum speed along one of said first axis and said second axis along which an amount of movement of the drive mechanism is smaller.

8. The control method for an automatic sewing machine as set forth in claim 7 further comprising:

controlling the drive mechanism along said axis in which the amount of movement is larger and said axis in which the amount of movement is smaller to have a uniform amount of movement.

9. The control method for an automatic sewing machine as set forth in claim 7, further comprising:

storing pulse spacing data; and outputting said spacing data for both said axes.

10. The method of controlling an automatic sewing machine as set forth in claim 17, wherein said determining steps comprise determining whether the difference of the ratio between the amounts of movement of the drive mechanism along said first and second axes before and after a point of inflection is equal to or less than a predetermined amount; and on the basis of such determination, controlling said two-axis drive mechanism prior to when a point of inflection is reached and after the point of inflection is reached at a speed slower than said maximum speed at which a two-axis drive mechanism is movable.

11. A control method for an automatic sewing machine having a spindle and a two-axis drive mechanism, comprising:

controlling said two-axis drive mechanism so as to be driven at a speed slower than a maximum speed at at least one location on an axis along which the two-axis drive mechanism is driven at the maximum speed.

12. An automatic sewing machine which has a sewing machine mechanism for controlling movement of a spindle and is operative to sew a predetermined pattern in a plurality of stitches, comprising:

cloth retaining means for clamping an article to be sewed;

a two-axis drive mechanism operative to move said cloth retaining means at least along a first axis and a second axis, independently;

processing means for processing commands for sewing in said predetermined pattern and for generating at least first data and second data for controlling movement of said cloth retaining means along said first axis and said second axis, respectively;

drive control means for drivingly controlling said two-axis drive mechanism to move said cloth retaining means to desired positions, said drive control means being operative in response to said first data and said second data to move said two-axis drive mechanism at a speed equal to or less than a maximum speed; and control means for controlling movement of said cloth retaining means along said first axis and said second axis, selected ones of said first data and said second data being operative to control movement of said cloth retaining means at a speed slower than said maximum speed at which said two-axis drive mechanism is moveable along said first axis and said second axis, said control means being operative to compute a point of inflection before driving starts; and wherein, at predetermined positions prior to reaching said point of inflection and after reaching said point of inflection, movement of said cloth retaining means is controlled by said control means at a speed slower than said maximum speed at which said two-axis drive mechanism in movable.

13. An automatic sewing machine, according to claim 12, further comprising a weight switch means which is selected when a weight load is loaded on said two-axis drive mechanism and wherein, before and after said point of inflection, said control means executes control such that one of (i) a maximum speed of said two-axis drive mechanism is lowered automatically and (ii) a drive speed at a drive start of said two-axis drive mechanism and at a point of inflection is lowered, in relation to an operational state of said weight switch.

14. An automatic sewing machine, according to claim 12, wherein, before and after said point of inflection, in case where a difference of a ratio between the amount of movement of said first axis and the amount of movement of said second axis is approximately equal to a predetermined value, said two-axis drive mechanism is controlled so as to be driven at the maximum speed even at said point of inflection.

15. An automatic sewing machine having a spindle, comprising:

a motor for driving said spindle of said sewing machine;

cloth retaining means for clamping an article to be sewed;

a two-axis drive mechanism capable of moving said cloth retaining means in a first-direction and a second-direction, independently; and drive control means for drivingly controlling said two-axis drive mechanism thereby moving said cloth retaining means to a predetermined position;

wherein, in movement along said first axis and said second axis, said two-axis drive mechanism moves at a maximum speed along at least one axis except at at least one location on said at least one axis where said two-axis drive mechanism is controlled so as to be driven at a speed slower than the maximum speed.

16. A control apparatus for an automatic sewing machine having a spingle, comprising:

a motor for driving said spindle of said sewing machine;

cloth retaining means for clamping an article to be sewed;

a two-axis drive mechanism capable of moving said cloth retaining means in a first-direction and a second-direction, independently; and drive control means for drivingly controlling said two-axis drive mechanism thereby moving said cloth retaining means to a predetermined position;

a weight switch which is selected when a weight load is loaded on said two-axis drive mechanism;

wherein, in movement along said first axis and said second axis, control is executed such that one of (i) a maximum speed of said two-axis drive mechanism is lowered automatically and (ii) a drive speed at drive start of said two-axis drive mechanism and at a point of inflection is lowered, in relation to an operation state of said weight switch.

17. A control apparatus for an automatic sewing machine having a spindle, comprising:

a motor for driving said spindle of said sewing machine;

cloth retaining means for clamping an article to be sewed;

a two-axis drive mechanism having a driving motor, capable of moving said cloth retaining means in a first-direction and a second-direction, independently, which are perpendicular to each other;

drive control means for drivingly controlling said two-axis drive mechanism thereby moving said cloth retaining means to a predetermined position;

modification means for altering a method of exciting a drive motor for said two-axis drive mechanism by switching a stepping motor between 2-phase excitation, 1-phase excitation, and half step driving.

18. A control method for an automatic sewing machine having a drive motor for driving a spindle and a drive mechanism for moving a cloth retaining unit in a predetermined pattern to permit sewing of a plurality of stitches, said drive mechanism comprising at least a first stepping motor for providing movement in a first axis direction and a second stepping motor for providing movement in a second axis direction, said movement being at speeds equal to or less than a maximum speed, and a processing unit for controlling the operation of said machine, comprising:

determining points of inflection using preprogrammed movement along each of said first axis and said second axis;

on the basis of said points of inflection, generating for a present stitch at least one of first pulses which are drive commands to said first stepping motor and second pulses which are drive commands to said second stepping motor; and moving the drive mechanism, which is driven by said first pulses and said second pulses, along said first axis and said second axis of a speed wherein movement before and after said points of inflection is slower than said maximum speed.

19. The control method for an automatic sewing machine as set forth in claim 7 further comprising:

controlling the drive mechanism along the axis in which the amount of movement is smaller on the basis of a ratio of the amount of movement along said axis along which the amount of movement is larger to the amount of movement along said axis in which the amount of movement is smaller.

* * * * *